(12) United States Patent
Zhang et al.

(10) Patent No.: US 10,222,501 B2
(45) Date of Patent: Mar. 5, 2019

(54) TELEVIEWER IMAGE WOOD-GRAIN REDUCTION TECHNIQUES

(71) Applicant: BAKER HUGHES INCORPORATED, Houston, TX (US)

(72) Inventors: Zhijuan Zhang, Houston, TX (US); Douglas J. Patterson, Magnolia, TX (US); Roger R. Steinsiek, Houston, TX (US); Wei Han, Sugar Land, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 92 days.

(21) Appl. No.: 15/409,200

(22) Filed: Jan. 18, 2017

(65) Prior Publication Data

US 2017/0212263 A1     Jul. 27, 2017

Related U.S. Application Data

(60) Provisional application No. 62/286,766, filed on Jan. 25, 2016.

(51) Int. Cl.
*G01V 1/50*     (2006.01)
*E21B 47/00*     (2012.01)
(Continued)

(52) U.S. Cl.
CPC ............ *G01V 1/50* (2013.01); *E21B 47/0005* (2013.01); *G01V 1/40* (2013.01); *G01V 1/34* (2013.01);
(Continued)

(58) Field of Classification Search
CPC ... G01V 1/40; G01V 1/44; G01V 1/50; E21B 47/0005
(Continued)

(56) References Cited

U.S. PATENT DOCUMENTS 8,634,272 B2    1/2014   Steinsiek et al.
9,171,356 B2    10/2015   Sugiura et al.
(Continued)

FOREIGN PATENT DOCUMENTS

CA       2759488 A1    10/2010
WO   2010123746 A2    10/2010

*Primary Examiner* — Ian J Lobo
(74) *Attorney, Agent, or Firm* — Mossman, Kumar & Tyler, P.C.

(57) ABSTRACT

Systems, devices, and methods for evaluating an earth formation intersected by a borehole using signals produced at a plurality of borehole depths by an ultrasonic transducer in the borehole, the signals produced by the transducer including ringdown signals from the ultrasonic transducer and echo signals from a wall of the borehole from a plurality of azimuthal orientations. Methods include using peak amplitude values and arrival time values from the signals to construct a background modulation template corresponding to at least one depth; estimating, for each respective depth of the plurality of borehole depths, an azimuthally varying interference pattern predominantly resulting from a ringdown signal for each respective depth by mapping the modulation template to arrival time values corresponding to the respective depth; and subtracting, for each respective depth, the estimated varying interference pattern from the peak amplitude values corresponding to the respective depth to generate adjusted peak amplitudes.

14 Claims, 19 Drawing Sheets

(51) Int. Cl.
*G01V 1/40* (2006.01)
*G01V 1/34* (2006.01)
*G01V 1/52* (2006.01)

(52) U.S. Cl.
CPC ............ *G01V 1/52* (2013.01); *G01V 2210/20* (2013.01); *G01V 2210/6222* (2013.01); *G01V 2210/74* (2013.01)

(58) Field of Classification Search
USPC ................................................ 367/27–30, 35
See application file for complete search history.

(56) References Cited

U.S. PATENT DOCUMENTS

2010/0265796 A1 10/2010 Steinsiek et al.
2017/0115423 A1* 4/2017 Hori ......................... G01V 1/50

* cited by examiner

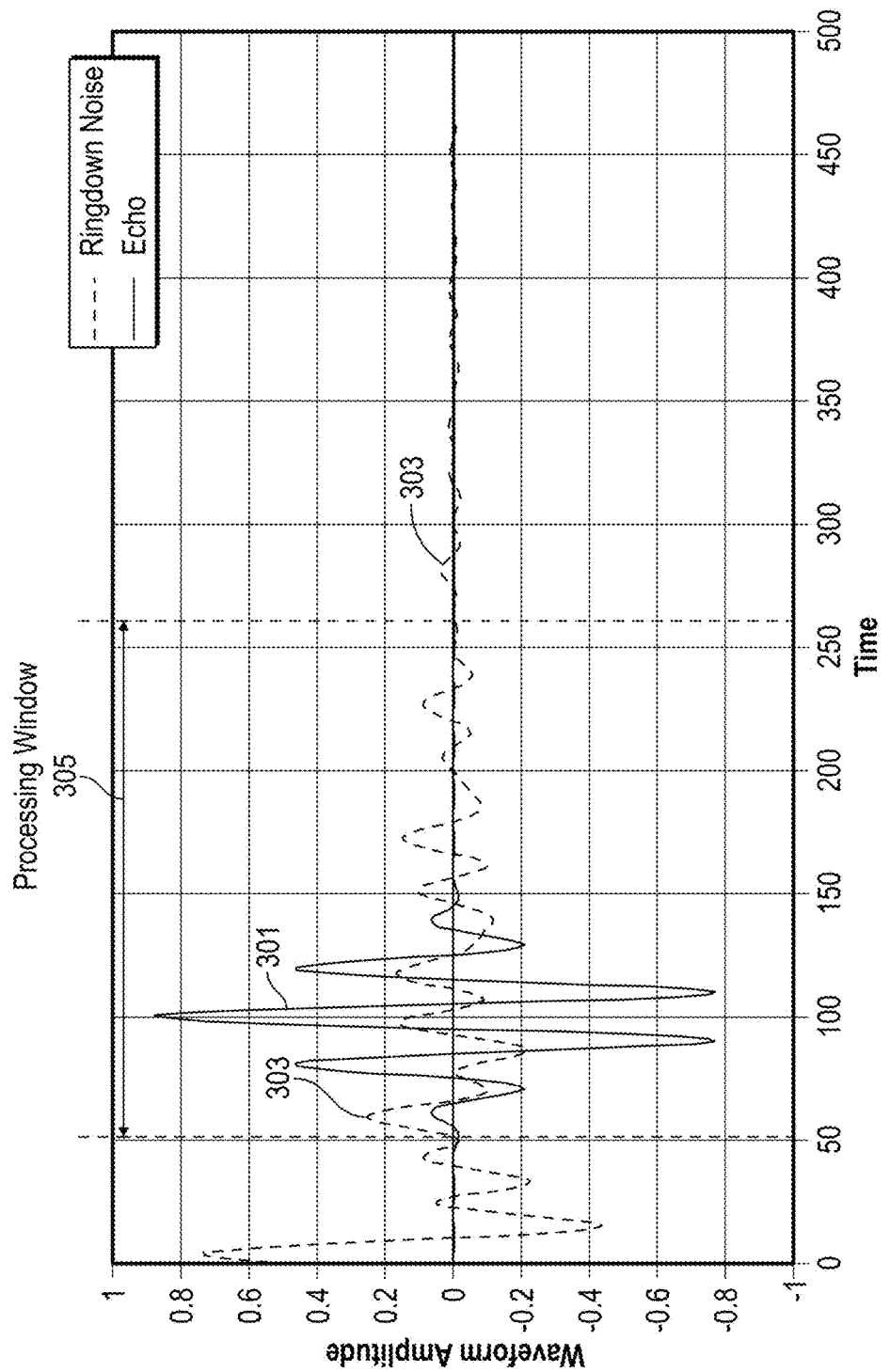

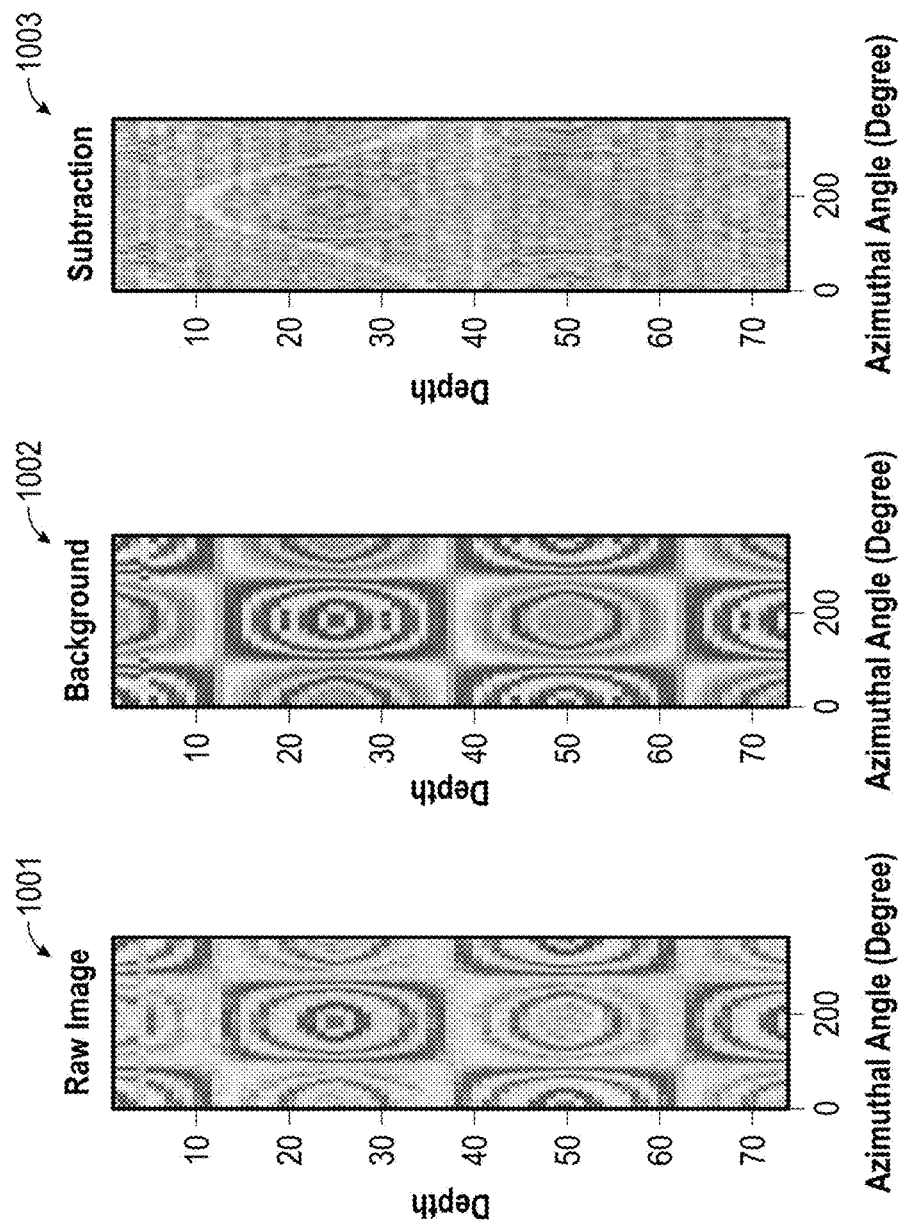

TELEVIEWER IMAGE WOOD-GRAIN REDUCTION TECHNIQUES

CROSS-REFERENCE TO RELATED APPLICATIONS

This application claims priority from U.S. Provisional Patent Application Ser. No. 62/286,766 filed on Jan. 25, 2016, the disclosure of which is incorporated herein by reference in its entirety.

FIELD OF THE DISCLOSURE

In one aspect, this disclosure relates generally to a downhole acoustic logging tool is provided for imaging the texture and structure of the borehole sidewall. The signal components are processed to provide an image in which the "wood-grain" image artifact is reduced.

BACKGROUND OF THE DISCLOSURE

Typical acoustic logging tools may include, by way of example, ultrasonic techniques commonly referred to as a televiewer, which comprises a rotating ultrasonic acoustic transducer that operates in a frequency range on the order of 100 kHz or more. Higher acoustic frequencies are preferred in order to achieve better resolution in the confined space of a borehole. In operation, the televiewer rotates at a desired rate such as 5 to 16 rotations per second to continuously scan the borehole sidewall as the televiewer is drawn up the borehole at a rate that is typically ³⁄₁₆ to ⅜ inch per scan. A beam of acoustic pulses is launched along the normal to the borehole sidewall as the transducer scans the interior surface of the borehole. The pulse rate depends upon the desired spatial resolution such as, for example, 1500 pulses per second or 128 to 256 pulses per scan. The insonified borehole sidewall returns pulses reflected therefrom, back to the transducer on a time-multiplexed basis. The reflected acoustic signals are detected, amplified and displayed to provide a continuous picture of the texture and structure of the borehole sidewall. Other application include evaluation and characterization of a cement bond to a (steel) casing as well as the integrity of the casing itself.

The diameter of a borehole logger may be on the order of 2% in (7.3 cm), so that it can be run into relatively small boreholes. However, many borehole diameters are on the order of 10-14" (25.4-35.6 cm) or more so that the length of the acoustic-pulse trajectory from the transducer, through the borehole fluid to the borehole sidewall, may be up to 10" (25.4 cm). In the normal course of events, the borehole fluid is contaminated by drill cuttings, air bubbles and foreign matter which may severely attenuate the acoustic energy via scattering because the physical dimensions of the contaminants are comparable to the wavelength of the wavefields emitted by the transducer.

The televiewer signal is also contaminated by stationary noise. The stationary noise results from transducer ringdown and other effects which are not reflective of the borehole or formation. Transducer ringdown is related to transmitter construction, internal damping and transducer and load impedance mismatches. When a pulse-echo transducer is excited, a series of reflections of the transmit pulse within the transducer are generated, and superimposed upon the received echo. Ringdown noise modulates wall reflection echoes and often shows fast variation in image. The echo signal is the signal returned from the borehole formation or casing which contains desired information.

Neglecting borehole fluid attenuation, deflection, diffraction, and window insertion loss, the amplitude of the echo signal is a function of the acoustic impedance of the formation or casing. The arrival time of the echo signal within the process window will change with the instruments centralization and the shape of the borehole. As the echo signal moves in time, it is modulated by the stationary noise. Therefore, the detected peak amplitude is a function of the formation reflection, and the position of the echo within the process window. If the S/N ratio is low enough, the modulation causes the resulting televiewer amplitude image to be dominated by the periodic "wood grain" interference pattern.

A physical explanation of the "wood grain" is that the transducer ringing and reverberation noise is initiated when a pulse-echo signal is transmitted, so that the noise is stationary with respect to the echo signal. Herein, the term "ringdown" is used to describe both the ringing of the transducer when it is activated as well as any reverberation; that is, the sound that reflects back and forth between the transducer and other components of the tool. Interference between the ringdown and the echo signals results in a "wood grain" pattern on the amplitude image. The present disclosure addresses the problem of reducing the "wood grain" effects by discerning the pulse echo signal independently of the noise in substantially real-time, and/or post-acquisition.

SUMMARY OF THE DISCLOSURE

In aspects, the present disclosure is related to methods of evaluating an earth formation intersected by a borehole using signals produced at a plurality of borehole depths by an ultrasonic transducer in the borehole, the signals produced by the transducer including ringdown signals from the ultrasonic transducer and echo signals from a wall of the borehole from a plurality of azimuthal orientations. Methods include using peak amplitude values and arrival time values from the signals to construct a background modulation template corresponding to at least one depth; estimating, for each respective depth of the plurality of borehole depths, an azimuthally varying interference pattern predominantly resulting from a ringdown signal for each respective depth by mapping the modulation template to arrival time values corresponding to the respective depth; and subtracting, for each respective depth, the estimated varying interference pattern from the peak amplitude values corresponding to the respective depth to generate adjusted peak amplitudes. The modulation template may be irregular.

Methods may include generating a two-dimensional image of the earth formation using the adjusted peak amplitudes. Methods may include identifying cement bonding information in the two-dimensional image. Using the peak amplitude values and the arrival time values to construct the background modulation template may include generating a curve representing the background modulation template by mapping each peak amplitude value with respect to a corresponding arrival time value at the at least one depth. Mapping the background modulation template to the arrival time values corresponding to the respective depth may include correlating the arrival time values with the background modulation template.

Methods may include obtaining arrival time values by determining initial arrival time values from the signals and then removing effects of features of the borehole by performing at least one of: i) discarding data corresponding to those values of the initial peak amplitude values which exceed a statistical deviation threshold; and ii) smoothing the initial arrival time values. Smoothing the initial arrival time values may include applying at least one of: i) a discrete cosine transform, ii) a Fourier transform, iii) an average filter, iv) a mean filter, v) a median filter, vi) a bandpass filter, vii) a low pass filter, viii) a wavelet transform, and ix) curve fitting.

Methods may include identifying borehole feature information in the background modulation template and preserving the borehole feature information. Methods may include modifying the background modulation template to preserve borehole feature information. Estimating the azimuthally varying interference pattern may include generating an initial interference pattern and removing borehole feature information from the initial interference pattern to obtain the azimuthally varying interference pattern. Subtracting the estimated interference pattern may include applying an image partition on the estimated varying interference pattern to determine residue containing borehole feature information and adding the residue to the adjusted peaks. The arrival time values may comprise an arrival time image, and the peak amplitude values may comprise an amplitude image. The signals may result from a downhole operation in the formation, the downhole operation comprising at least one of: i) logging-while-drilling borehole imaging, ii) wireline borehole imaging, iii) casing inspection; and iv) cement evaluation. Some embodiments may include conveying the at least one acoustic sensor in the borehole on a conveyance device; and performing a drilling operation.

Apparatus embodiments may include at least one processor configured to use peak amplitude values and arrival time values from the signals to construct a background modulation template corresponding to at least one depth; estimate, for each respective depth of the plurality of borehole depths, an azimuthally varying interference pattern predominantly resulting from a ringdown signal for each respective depth by mapping the modulation template to arrival time values corresponding to the respective depth; and subtract, for each respective depth, the estimated varying interference pattern from the peak amplitude values corresponding to the respective depth to generate adjusted peak amplitudes. The transducer may be on a tool and the at least one processor may be on the tool or communicatively coupled to the tool to receive signal information. The at least one processor may be at least one of: i) downhole, and ii) at the surface. The at least one processor may be configured by providing computer program instructions on a non-transitory computer readable medium accessible to the at least one processor, wherein execution of the computer program instructions by the at least one processor causes methods of the present disclosure to be carried out.

Embodiments according to the present disclosure may include apparatus for evaluating a formation intersected by a borehole, comprising: a processor; a non-transitory computer-readable medium; and a program stored by the non-transitory computer-readable medium comprising instructions that, when executed, cause the processor to perform a method as described herein.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 3A shows an example signal recorded with a transducer assembly in accordance with embodiments of the present disclosure.

FIG. 10 is a synthetic example illustrating techniques in accordance with embodiments of the present disclosure.

DETAILED DESCRIPTION

Figure 1A:
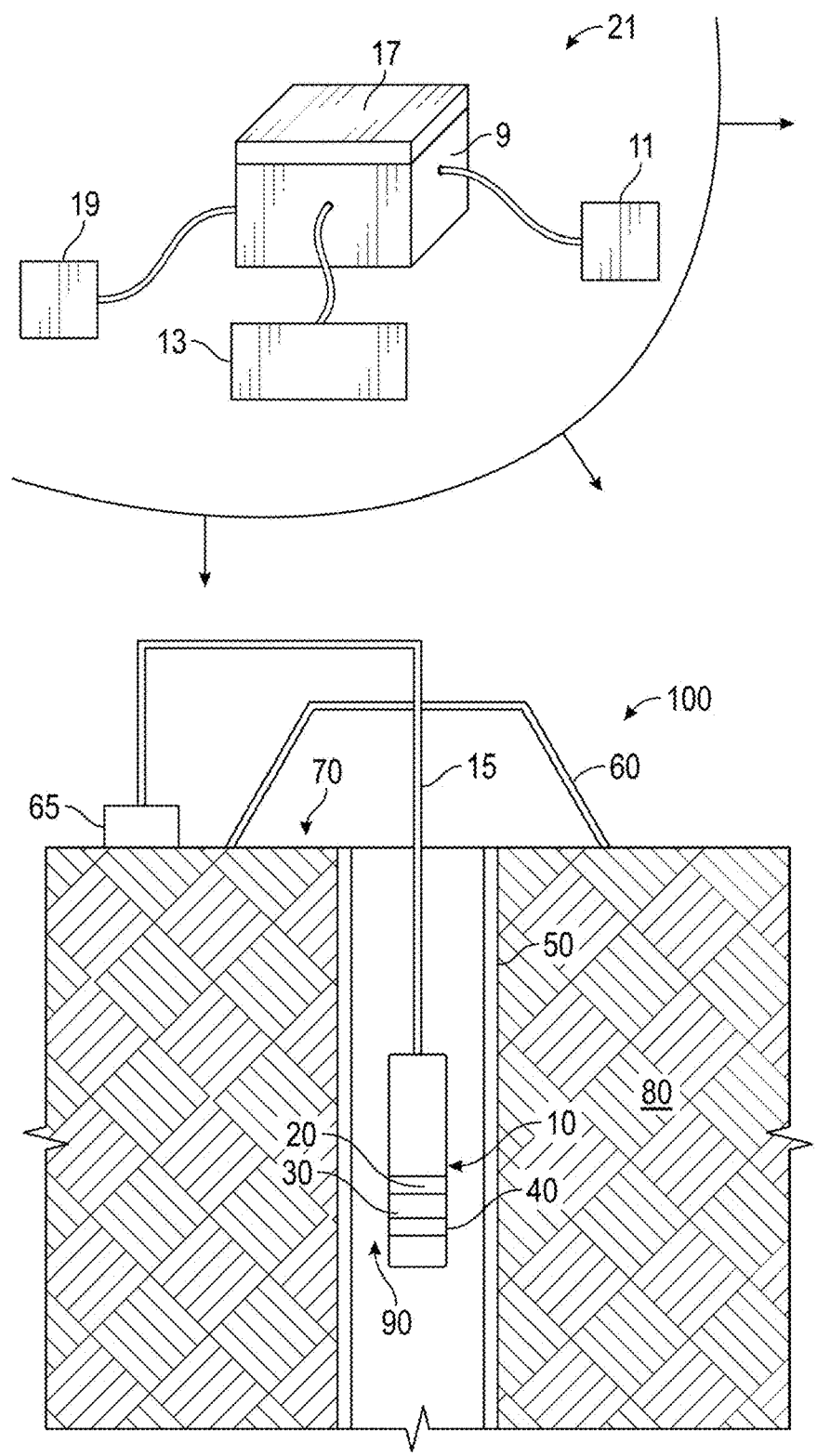
FIG. 1A schematically illustrates an acoustic wellbore logging system having a downhole tool configured to acquire information for producing an acoustic image of a borehole in accordance with embodiments of the present disclosure.

Aspects of the present disclosure include acoustic evaluation of a borehole. More particularly, in some aspects, the present disclosure includes post-processing techniques for reducing background "wood-grain" interference pattern in a pulse-echo ultrasonic image while preserving borehole features.

In the oil and gas industry, ultrasonic imaging tools are actively used in logging applications such as stress identification, borehole breakout, fracture detection, casing inspection, cement bond evaluation, and so on. Pulse-echo transducers measure the properties of the echoes reflected from the formation, and the signal amplitude and travel time may be used to generate a circumferential image which may allow detection of borehole features such as fracture, washout, dipping, bed boundary, and the like.

The quality of an ultrasonic image may be affected by several factors, including borehole features, transducer ringdown, tool eccentricity, mud attenuation, signal sensitivity variation, etc. Signal amplitude is a combined response to these effects.

These effects result in interference background patterns in the amplitude-based image, which causes lower signal-to-noise contrast and limited feature detection. Previous processing methods have deficiencies, including limited applicability (e.g., only a particular individual background noise source), requiring prior knowledge of material properties, or demanding complex modeling or inversion. In order to overcome the limitations of the prior methods, the novel techniques of this disclosure correct for both fast- and slow-variation noises, and improve borehole feature contrast in images.

Transducer ringdown may be related to transmitter construction, internal damping and transducer and load impedance mismatches. When a pulse-echo transducer is excited, a series of reflections of the transmit pulse within the transducer are generated, and superimposed upon the received echo. Ringdown noise modulates wall reflection echoes and often shows fast-variation in image. Tool eccentricity, transducer oblique reflection, and mud attenuation may also greatly affect signal return. If uncorrected, they often show as slow-variation background pattern in amplitude-based images.

It is challenging to maintain centralization of the ultrasonic tool in the borehole, particularly in logging-while-drilling ('LWD') or measurement-while-drilling applications, and tool eccentricity may vary as the tool moves from one depth to another depth. Therefore, the transducer ringdown may modulate the measured response constructively or destructively at different depths because of eccentricity. Thus the detected peak amplitudes measured during any given single revolution of the transducer may vary.

The tool's eccentricity defines a processing window and echo arrivals are within it. Ringdown modulates echoes in the processing window, causing variations on the peak amplitudes. The modulation effect creates an interference pattern which often dominates the acquired image, as shown in FIG. 2B, below.

In addition to reducing the cognitive discernment of the image interpreter, the "woodgrain" pattern also limits the ability to perform any quantitative image analysis, as the artifact contaminates any results derived from the image. The method of the present disclosure mitigates the presence of image artifacts in order to enhance ultrasonic image quality and improve interpretation.

Core concepts of the present disclosure include ringdown modulation template construction, background interference pattern estimation, and image subtraction. Each of these steps may be applied in post-processing. For example, the technique may be applied to legacy data (e.g., previously acquired borehole images) wherein the raw waveforms from the tool are no longer available. In contrast to previous methods appropriately characterized as pre-processing methods, which require the raw waveform as input, methods of the present disclosure may be performed using only the images. Raw waveforms are not required. From a hardware requirement perspective, down-hole processing may be performed on raw waveforms to generate images for future processing, which results in lower down-hole memory requirements, or conversely, eases requirements for transmission bandwidth.

Synthetic data and field tests show promising results. In application, the method inputs signal amplitudes and travel times from samples of multiple revolutions or depths for interference background template generation. The length of the (axial) depth window may be adjusted (a small window size may sometimes be preferred) in dependence upon the formation variation and instability of ringdown. One example window size may be 1 foot, but could be larger or smaller.

The method first constructs a background modulation template and estimates an azimuthally varying interference pattern predominantly resulting from a ringdown signal at a borehole depth (i.e. over a short depth range), then repeats this process for a plurality of depth ranges extending a length of the borehole to iteratively estimate a background interference image. The background interference image may then be subtracted from the raw image to produce an adjusted image in which the ringdown effects are mitigated. The method may be supplemental to the current capabilities in wireline and LWD ultrasonic image (e.g., post-processing).

General embodiments of the present disclosure include methods, devices, and systems for improving an acoustic well log of a borehole intersecting an earth formation. Method embodiments may include using at least one acoustic sensor to produce well logging information responsive to a reflection of an emitted acoustic wave from a wall of the borehole. The information is indicative of a parameter of interest relating to the well log, such as, for example, information relating to the borehole (e.g., borehole geometry), the formation (e.g., bed boundary identification), or associated infrastructure (e.g., casing evaluation). The term "information" as used herein includes any form of information (analog, digital, EM, printed, etc.), and may include one or more of: raw data, processed data, and signals. Methods may also include generating the improved well logging information from existing data.

Methods may include evaluating the improved well logging information, and performing further borehole operations in dependence upon the evaluation or the information. Embodiments may include performing further operations in the formation in dependence upon the evaluation, including, for example, in dependence upon an enhanced acoustic image. In particular embodiments, borehole events, state of drilling operations, characteristics of the borehole or formation, or orientation of components of the downhole tool may be estimated using the parameter of interest, and then used in performing an operation as described above. For example, in response to a detection of a washout, corrective measures may be taken; and so on.

FIG. 1A schematically illustrates an acoustic wellbore logging system 100 having a downhole tool 10 configured to acquire information for producing an acoustic image of a borehole 50 in an earth formation 80 or another parameter of interest of a formation 80 using a sensor 40 comprising at least one acoustic transducer. Sensor 40 may include a plurality of transducers in an azimuthal array about the circumference of the tool, a transducer that rotates through a plurality of azimuthal orientations via the rotation of the drill string or of an independent platform attached to the carrier, or a transducer capable of sending acoustic pulses to and receiving signals from a plurality of azimuthal orientations via the use of beam-forming.

The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit.

A surface control system 65 receives signals from downhole sensor 40 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the sensor 40, and may control one or more downhole operations performed by system 100.

In one embodiment, electronics 30 associated with sensors 40 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the transducers (described in further detail below with respect to FIG. 2) may be configured to take measurements at a plurality of azimuthal orientations as the tool moves along the longitudinal axis of the borehole ('axially') using sensor 40. These measurements may be substantially continuous, which may be defined as being repeated at very small increments of depth and azimuth, such that the resulting information has sufficient scope and resolution to provide an image of borehole parameters (e.g., electrical properties of the formation at the borehole.

In other embodiments, electronics may be located elsewhere (e.g., at the surface, or remotely). To perform the treatments during a single trip, the tool may use a high bandwidth transmission to transmit the information acquired by detectors 20, 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

One point of novelty of the system illustrated in FIG. 1A is that the at least one processor may be configured to perform certain methods (discussed below) that are not in the prior art. A surface control system or downhole control system may be configured to control the tool described above and any incorporated sensors and to estimate a parameter of interest according to methods described herein.

Aspects of the present disclosure are subject to application in various different embodiments. In some general embodiments, carrier 15 is implemented as a tool string of a drilling system, and the acoustic wellbore logging may be characterized as "logging-while-drilling" (LWD) or "measurement-while-drilling" (MWD) operations.

Figure 1B:
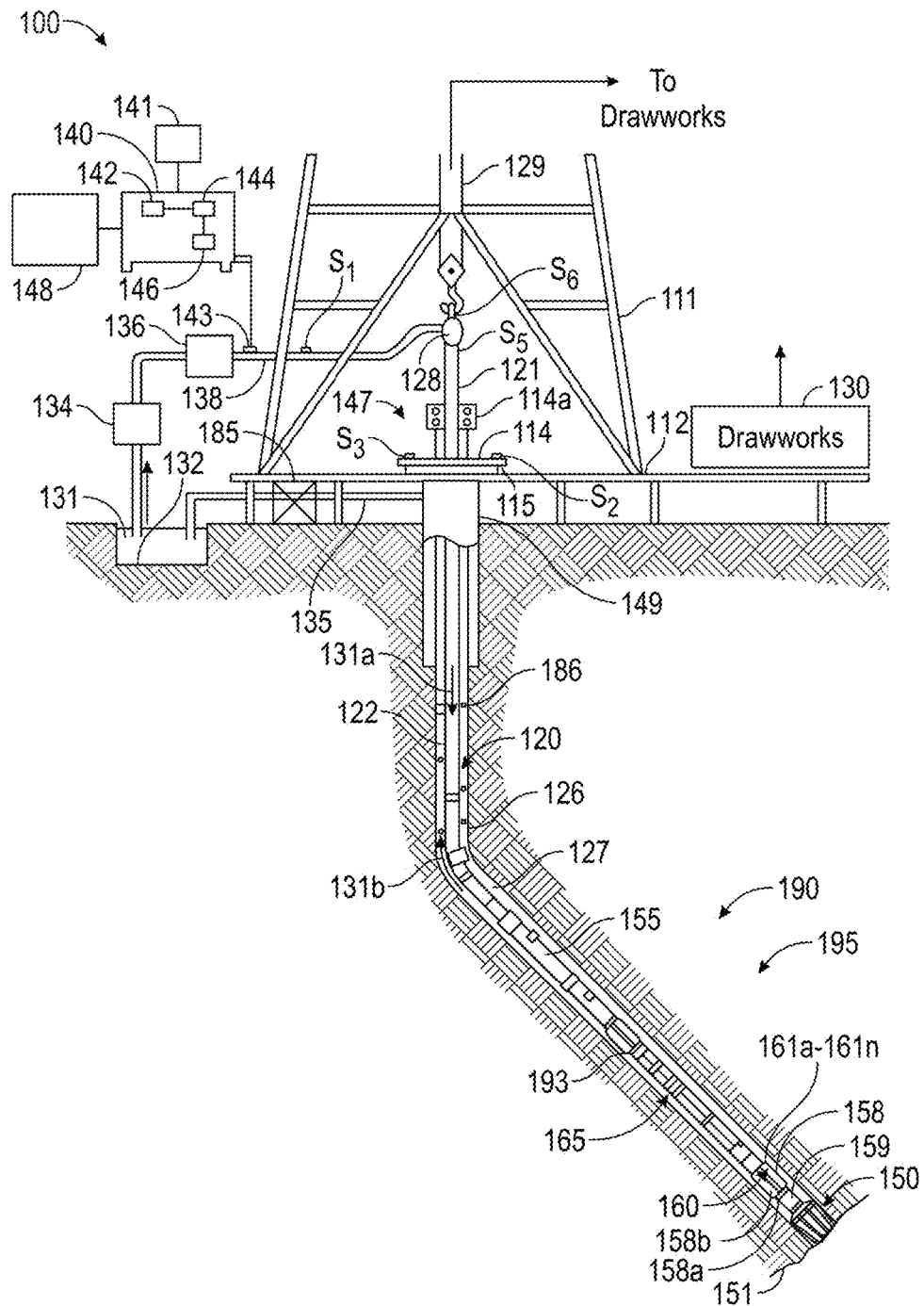
FIG. 1B is a schematic diagram of an exemplary drilling system in accordance with embodiments of the present disclosure.

FIG. 1B shows an exemplary embodiment of a system for evaluation of an earth formation using measurements from an acoustic logging system. The system 101 includes a carrier 111 that is shown disposed in a wellbore or borehole 126 that penetrates at least one earth formation 195. The system 101 also includes a tool 110 configured for taking ultrasonic pulse-echo measurements in the borehole.

As described herein, "borehole" or "wellbore" refers to a single hole that makes up all or part of a drilled well. Depending on the configuration, the system 101 may be used during drilling and/or after the wellbore 112 has been formed, including, in some instances after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

FIG. 1B is a schematic diagram of an exemplary drilling system 100 according to one embodiment of the disclosure. FIG. 1B shows a drill string 120 that includes a bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include a variety of other sensors and devices 159 for determining one or more properties of the BHA 190 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 100 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 190 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance device for sensors 165, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 100 may include a bottomhole assembly and/or sensors and equipment for implementation of embodiments of the present disclosure on either a drill string or a wireline.

A point of novelty of the system illustrated in FIG. 1B is that the surface processor 142 and/or the downhole processor 193 are configured to perform certain methods (discussed below) that are not in the prior art. Surface processor 142 or downhole processor 193 may be configured to control mud pump 134, drawworks 130, rotary table 114, downhole motor 155, other components of the BHA 190, or other components of the drilling system 100. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to use at least one sensor to produce a corresponding signal, responsive in part to a reflection of an emitted wave, from each of a plurality of azimuthally distributed orientations about a BHA. In some general embodiments, surface processor 142, downhole processor 193, or other processors (e.g. remote processors) may be configured to operate the tool 101 to excite and measure acoustic signals containing pulse echoes.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Figure 2A:
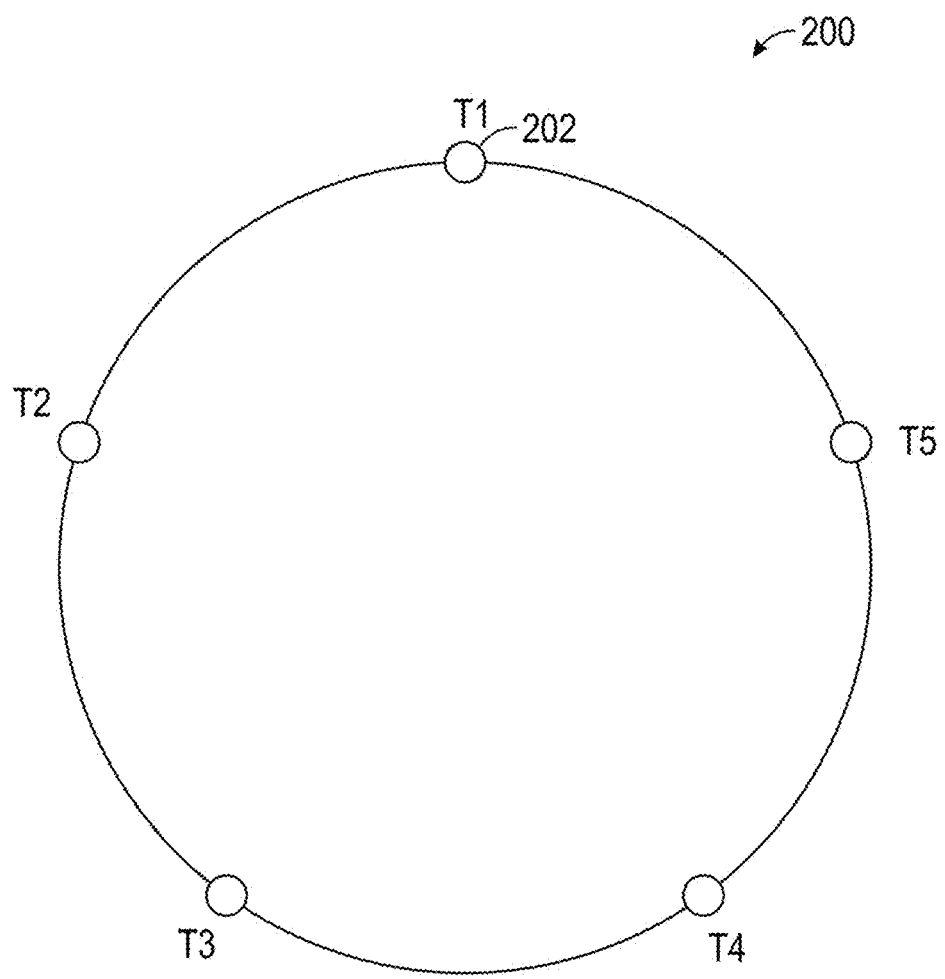
FIGS. 2A & 2B illustrate sensors in accordance with embodiments of the present disclosure.
Figure 2B:
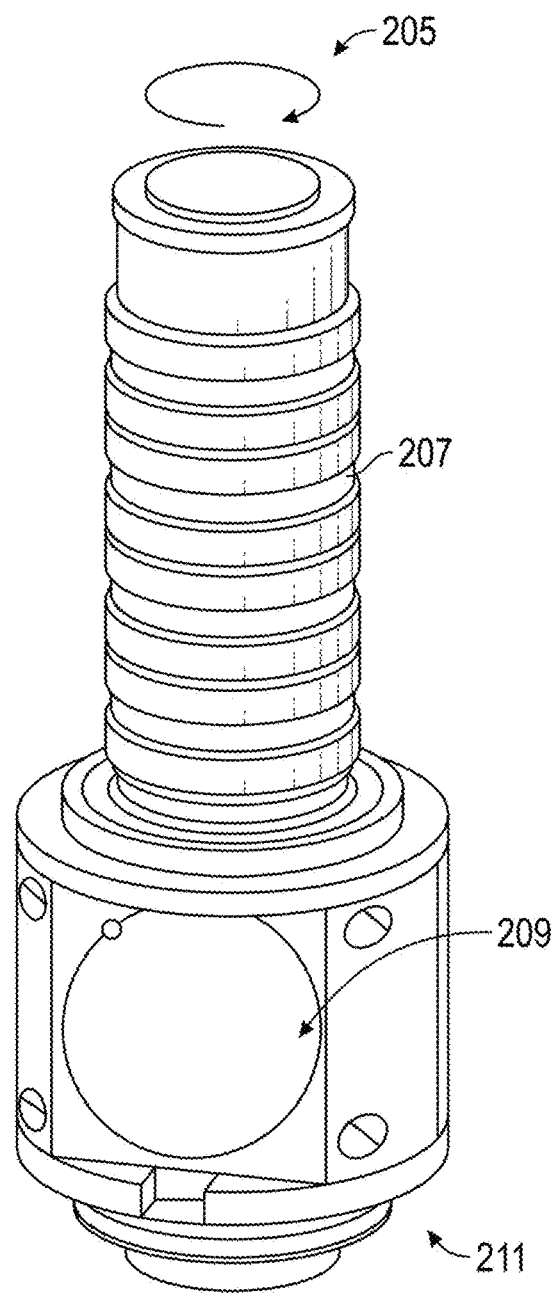

FIGS. 2A & 2B illustrate sensors in accordance with embodiments of the present disclosure. FIG. 2A illustrates a cross section of the carrier incorporating sensor 200. The sensor 200 includes five uniformly distributed (e.g. 72° apart) acoustic transducers 202 labeled T1-T5. The transducers may be solid-state ultrasonic acoustic transducers configured for pulse-echo operation. FIG. 2B illustrates another sensor in accordance with embodiments of the present disclosure. The sensor comprises a rotating platform 205 with an ultrasonic transducer assembly 209. The rotating platform is also provided with a magnetometer 211 to make measurements of the orientation of the platform and the ultrasonic transducer. The platform is provided with coils 207 that are the secondary coils of a transformer that are used for communicating information from the transducer and the magnetometer to the non-rotating part of the tool. The transducer may be made of a composite material. In operation, the transducer may be made to rotate about the longitudinal axis of the BHA, and to receive at each of the plurality of azimuthally distributed orientations the reflection of the corresponding emitted wave and produce the corresponding information. In other embodiments, a multi-directional acoustic sensor may be used. The multi-directional acoustic sensor may be configured for beamforming to receive from each of a plurality of azimuthally distributed orientations the reflection of the corresponding emitted wave. The sensor may then produce corresponding information associated with each orientation.

Those of ordinary skill in the art and having benefit of the present disclosure will recognize that the systems and tools described herein may optionally include other functional components, as described, for example, in U.S. Pat. No. 8,634,272 to Steinsiek et al., which are each hereby incorporated by reference herein in their entirety. Among these are electronics modules located at suitable locations on or within the tool, as would be understood by those or ordinary skill in the art. Various tool components may be mounted on a carrier in a conventional and well-known manner. One portion of the tool may contain a telemetry module (not shown) for sampling, digitizing and transmission of data samples from the various tool components uphole to surface electronics in a conventional arrangement.

Figure 3C:
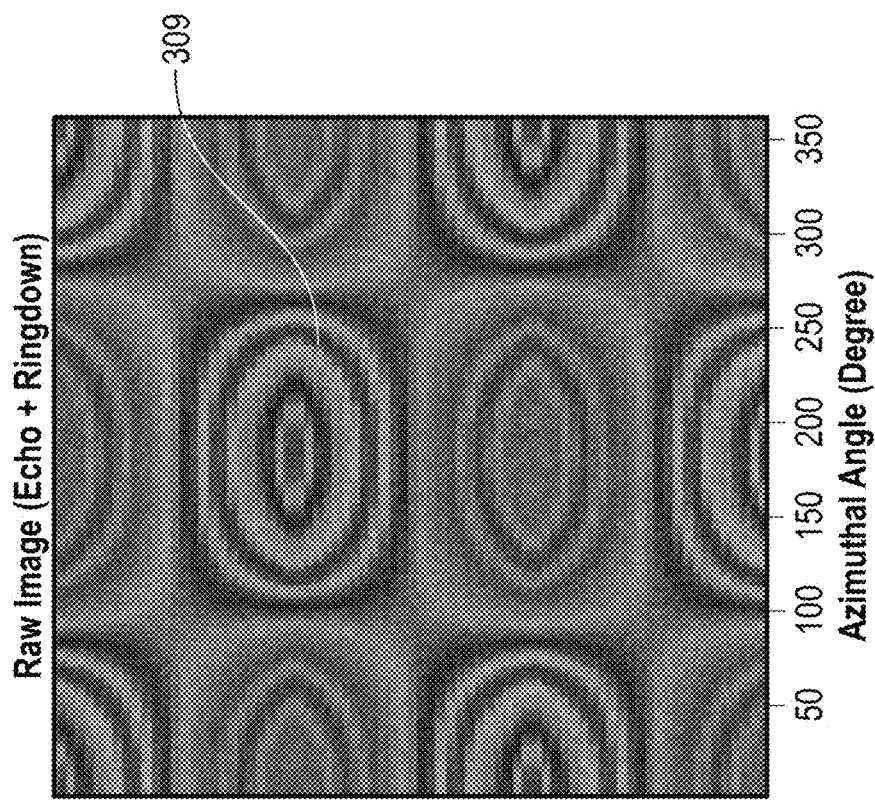
FIG. 3C shows an example interference pattern in accordance with embodiments of the present disclosure.
Figure 3B:
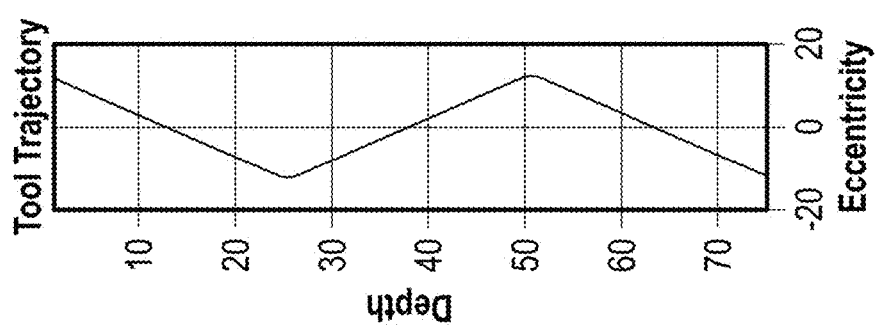
FIG. 3B shows eccentricity of the tool with depth in accordance with embodiments of the present disclosure.

FIG. 3A shows an exemplary signal recorded with a transducer assembly. FIG. 3B shows eccentricity of the tool with depth. Eccentricity defines a processing window 305 and echo arrivals are within it. Ringdown modulates echoes in the processing window, causing variations on the peak amplitudes. A problem encountered with televiewer signals is that of reverberations within the transducer assembly. The reflection from the borehole wall is indicated by 301 while the extended signal 303 results from ringdown of the transducer. As a result of interference between this ringdown and the echo signal, the amplitude image of the borehole wall has the character shown in FIG. 3C. The ordinate of the two-dimensional image of FIG. 3C is depth and the abscissa is the azimuth: the borehole wall has been "unwrapped" to give the image. The modulation effect creates an interference pattern ("wood-grain" pattern 309) which often dominates the acquired image, as shown in FIG. 3C.

Aspects of the present disclosure include using the peak amplitude values and peak arrival time values from the signals received by a transducer to construct a background modulation template corresponding to at least one depth; estimating, for each respective depth of the plurality of borehole depths, an azimuthally varying interference pattern predominantly resulting from a ringdown signal for each respective depth by mapping the modulation template to peak arrival time values corresponding to the respective depth; and subtracting, for each respective depth, the estimated varying interference pattern from the echo peak amplitude values corresponding to the respective depth to generate adjusted peaks echo peak amplitudes.

Figure 4:
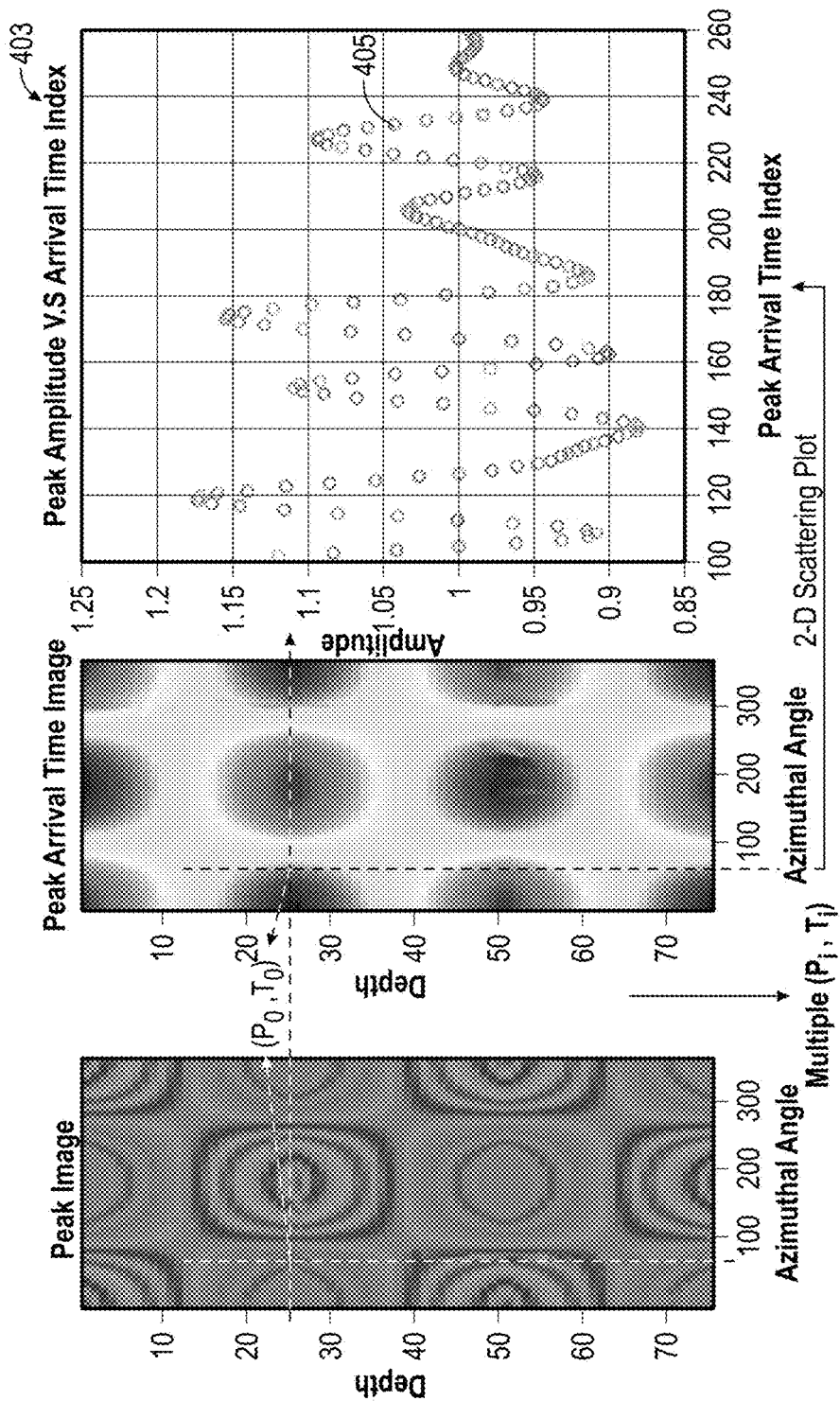
FIG. 4 is a data flow diagram illustrating generation of a background modulation template in accordance with the present disclosure.

FIG. 4 is a data flow diagram illustrating generation of a background modulation template in accordance with the present disclosure. The background modulation template may be extracted based on statistical analysis. A rotating transducer assembly is used to generate pulse echoes from the borehole wall. As shown in FIG. 4, paired peak amplitude and arrival times ($P_d$, $T_n$) from measurements at a plurality of azimuths in one revolution of the tool are associated with one another, for example, by mapping each peak amplitude value with respect to a corresponding peak arrival time value, such as, for example, by association via a data structure. The associated peak amplitude and arrival times ($P_d$, $T_n$) may be used to generate a curve indicative of the background modulation template by data fitting. The associated measurement values may be plotted as two-dimensional data points 405, for example, with peak amplitude values plotted with respect to the associated arrival time. Data fitting using the plotted data points on the scattering plot may be used to generate the curve. By gathering multiple peaks and corresponding arrival times from multiple revolutions within a certain depth window, a two dimensional ('2-D') scattering plot 403 shows peak variation versus arrival time. The modulation template is a data-derived template generated in dependence upon the peak amplitude and arrival times. The 2-D plot illuminates the nature of modulation of the formation echoes by the ringdown noise.

In other examples, the curve may be generated using the paired values via other mathematical techniques, including the generation of polynomials, regression analysis, least squares, trend estimation and so on.

Figure 5:
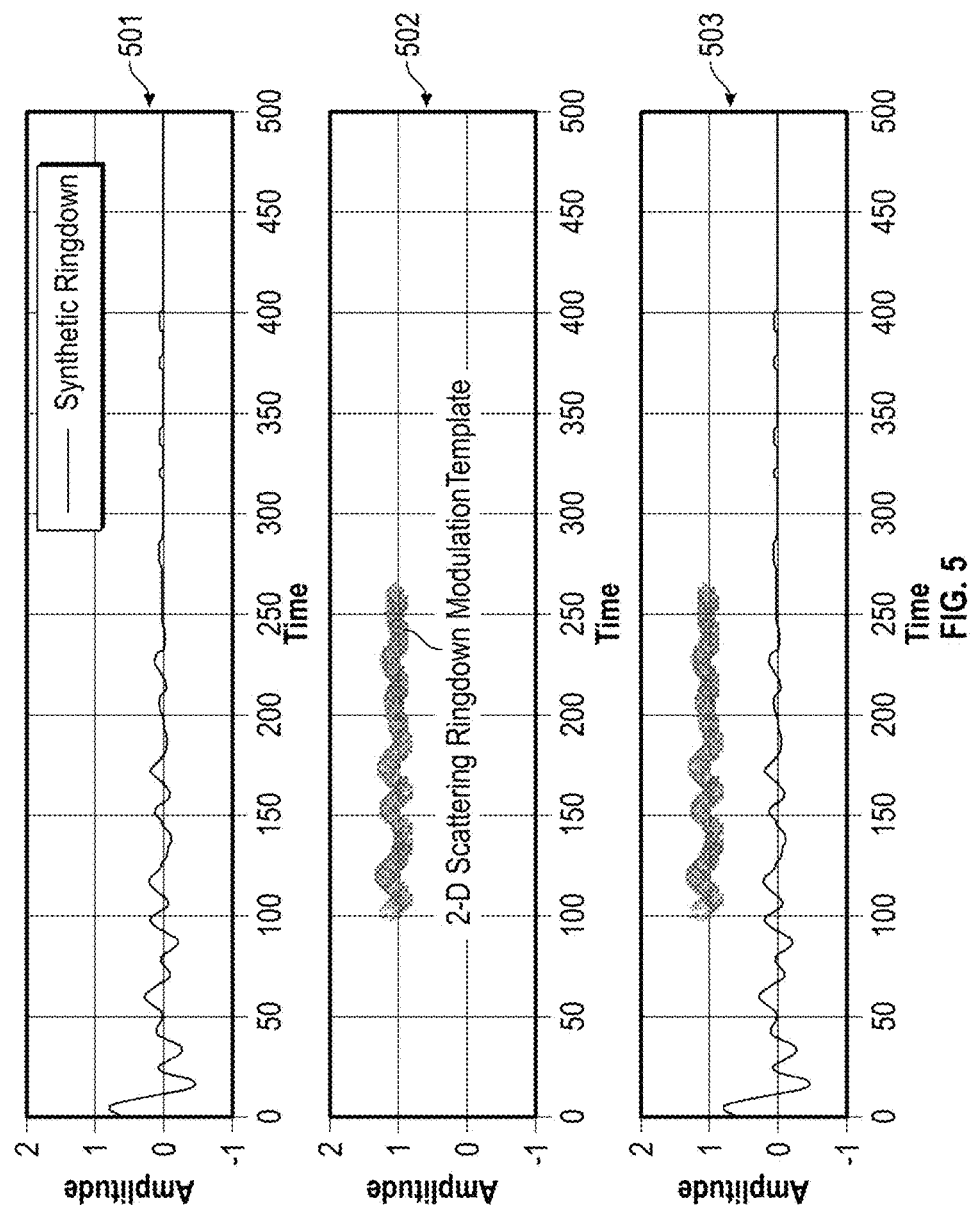
FIG. 5 shows an isolated synthetic ringdown, an isolated waveform extracted from the 2-D scattering plot, and a comparison between the two waveforms.

FIG. 5 shows an isolated synthetic ringdown 501, an isolated waveform extracted from the 2-D scattering plot 502, and a comparison 503 between the two waveforms. As shown in the comparison, the scattering waveform shows the same variation as the synthetic ringdown but different amplitudes. The difference on the amplitudes is expected since the received signal is a composite of ringdown and echo. The same variation among the two wave forms demonstrates that the modulation effect caused by ringdown is given by the extracted 2-D scattering plot. FIG. 5 provides confirmation that the ringdown modulation template is accurate.

FIG. 6A-6D illustrate signal properties characteristic to embodiments of the present disclosure. The arrival times of one revolution may be obtained straightforwardly from the 2-D time image, which may be employed to correlate arrival times with azimuthal angles. Estimating the azimuthally varying interference pattern may then be carried out by mapping the modulation template to peak arrival time values corresponding to the respective depth.

Figure 6A:
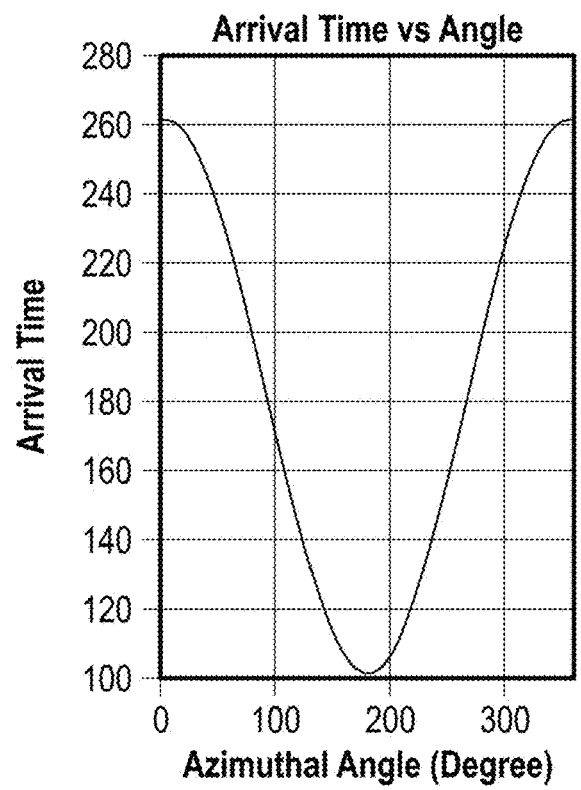
FIG. 6A-6D illustrate signal properties characteristic to embodiments of the present disclosure.
Figure 6B:
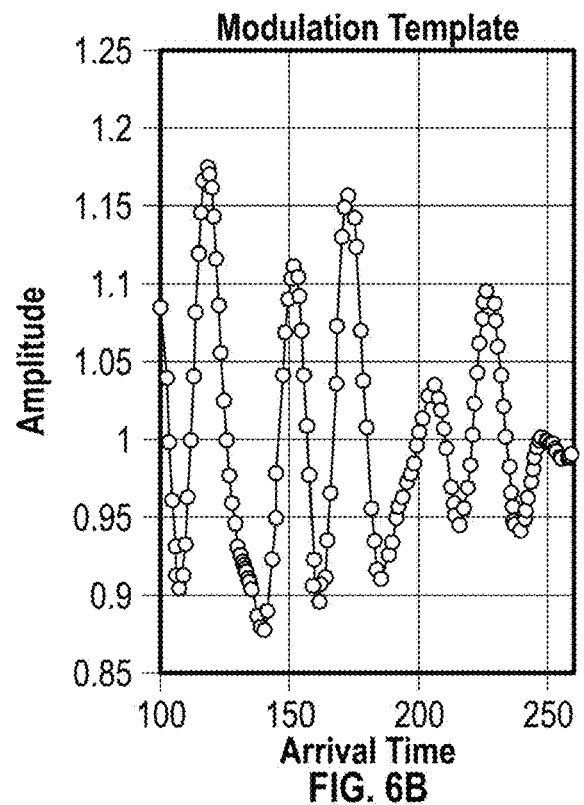
Figure 6C:
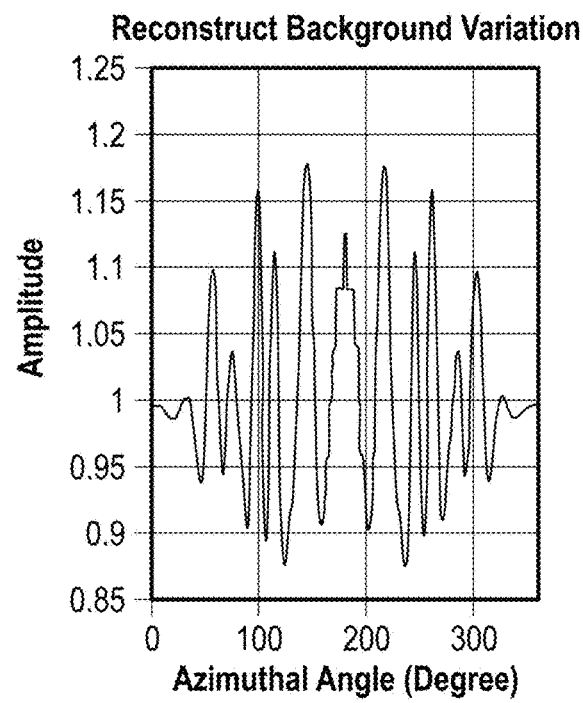
Figure 6D:
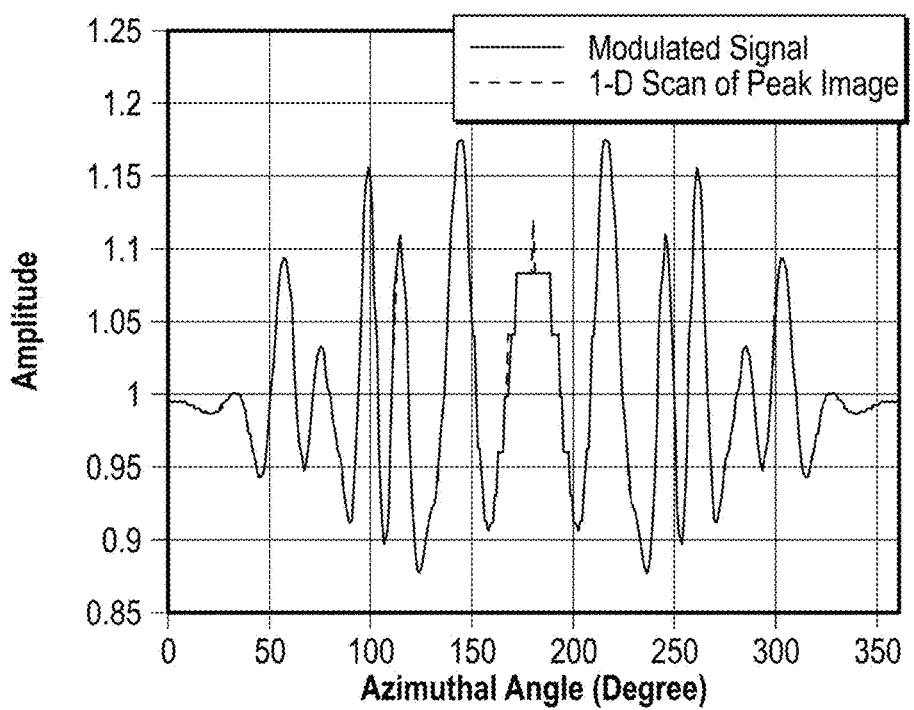

FIG. 6A shows a graphical plot of arrival time with respect to azimuthal angle for a single revolution. FIG. 6B shows a graphical display of the modulation template signal plotted as amplitude with respect to arrival time. The modulation template correlates the modulation effect with arrival times for multiple revolutions. FIG. 6C shows the result of mapping the template to peak arrival time values, which is representative of the azimuthally varying interference pattern. A new relation is derived, which correlates the modulation effect with azimuthal angles in the depth window. The azimuthally varying interference pattern is irregular by nature. FIG. 6D shows the pattern of FIG. 6C overlaid with a 1-D slide scan of a synthetic amplitude image at the same depth, confirming the efficacy of the process via simulation results.

The process may be repeated for a plurality of borehole depth along the borehole as desired until a complete interference pattern is generated. The tool may be moved axially along the borehole during measurement at a rate that corresponds with movement from 0.1 to 1 inch per scan. As described above, a beam of acoustic pulses may be launched along the normal to the borehole sidewall as the transducer scans the interior surface of the borehole. The pulse rate depends upon the desired spatial resolution such as, for example, 1000-3000 pulses per second (e.g., 1500 pulses per second, or 128 to 256 pulses per scan).

Figure 7:
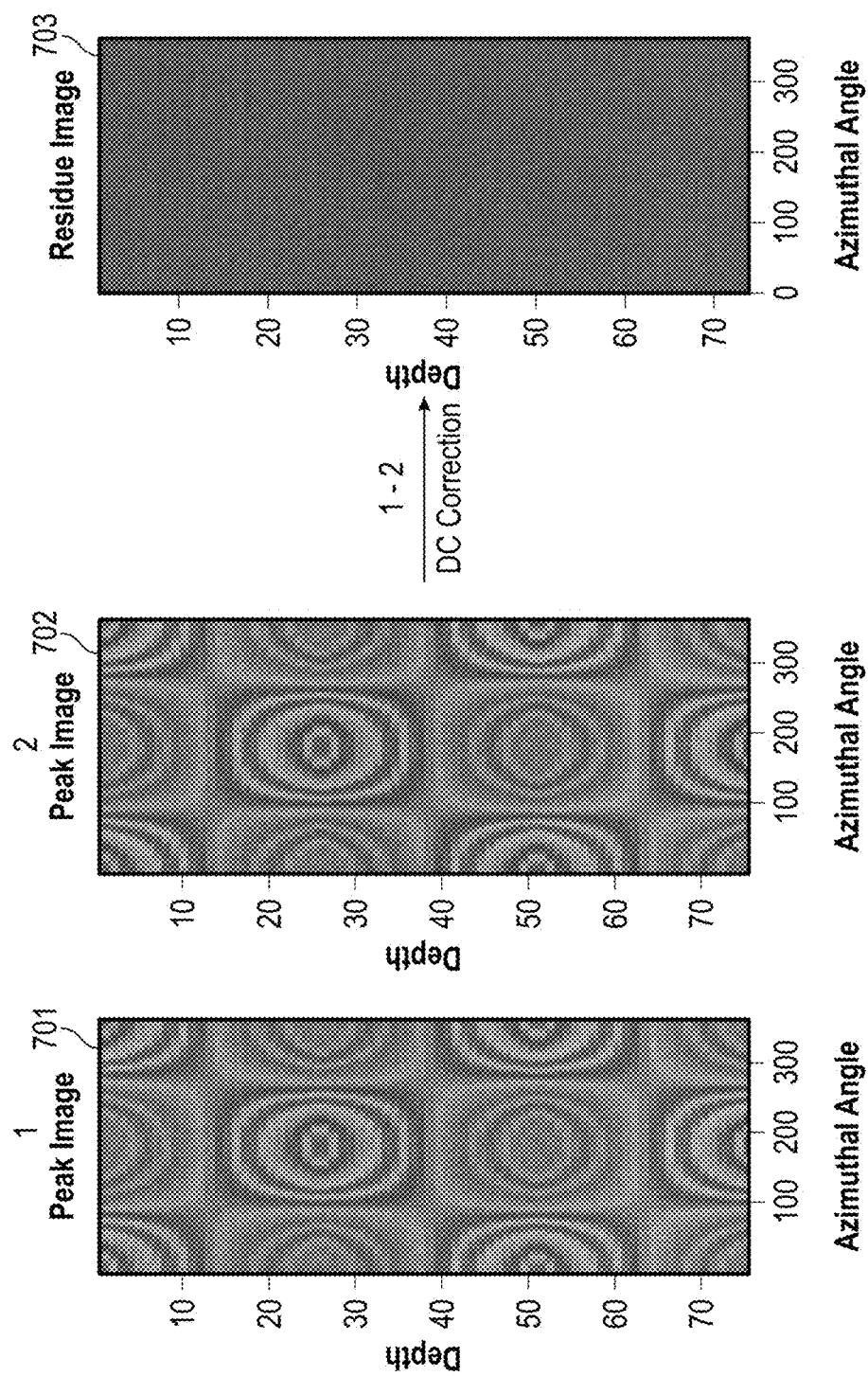
FIG. 7 illustrates techniques in accordance with embodiments of the present disclosure.

FIG. 7 illustrates techniques in accordance with embodiments of the present disclosure. For each respective depth, the estimated varying interference pattern may be subtracted from the echo peak amplitude values corresponding to the respective depth to generate adjusted echo peak amplitudes. Thus, in total, the complete estimated varying interference pattern 702 may be subtracted from the complete initial image of measurements 701 taken by the tool from the borehole. The background "wood-grain" pattern is thus removed from the original image by subtraction, as shown, resulting in the adjusted image 703 substantially free from interference caused by ringdown effects. Note that if the two images have different DC biases, the DC bias may be compensated after subtraction.

As described above, the amplitude of the echo signal is a function of the acoustic impedance of the formation or casing. However, the foregoing is a simplified and idealized description of physical relationships that are more complex in practical application. Those of ordinary skill in the art will appreciate that there are usually other variables to consider, for example the electrical and acoustic characteristics of the instrumentation itself and the acoustic characteristics of the environment under investigation. Described below are approaches for addressing some non-idealized factors.

In real-world applications, the nature of the data may be much more complex. For instance, the eccentricity effect on the tool may cause a shading effect and exacerbate the impact of background interference. Hence, quality control (QC) may be desirable. One objective of quality control is to diminish the irrelevant samples which may be outliers from drilling noises, inaccurate arrival time detection, or samples affected by borehole features (fractures, breakouts, etc.). The impact of these biased samples could spoil the modulation template in the core processing.

Aspects of the present disclosure isolate formation features from the background by first, smoothing arrival time over azimuth angles measurements (e.g., by applying a transform to remove spikes), and second, removing outliers on the amplitudes according to statistical analysis.

Borehole features (e.g., fractures) can cause spikes or other higher frequency effects on the arrival time. The low frequency sinusoidal trend may be dominated by eccentricity effect and be closely related to the background interference pattern. The transform is used to desensitize the arrival time to borehole features and preserve the feature within the background pattern.

Figure 8:
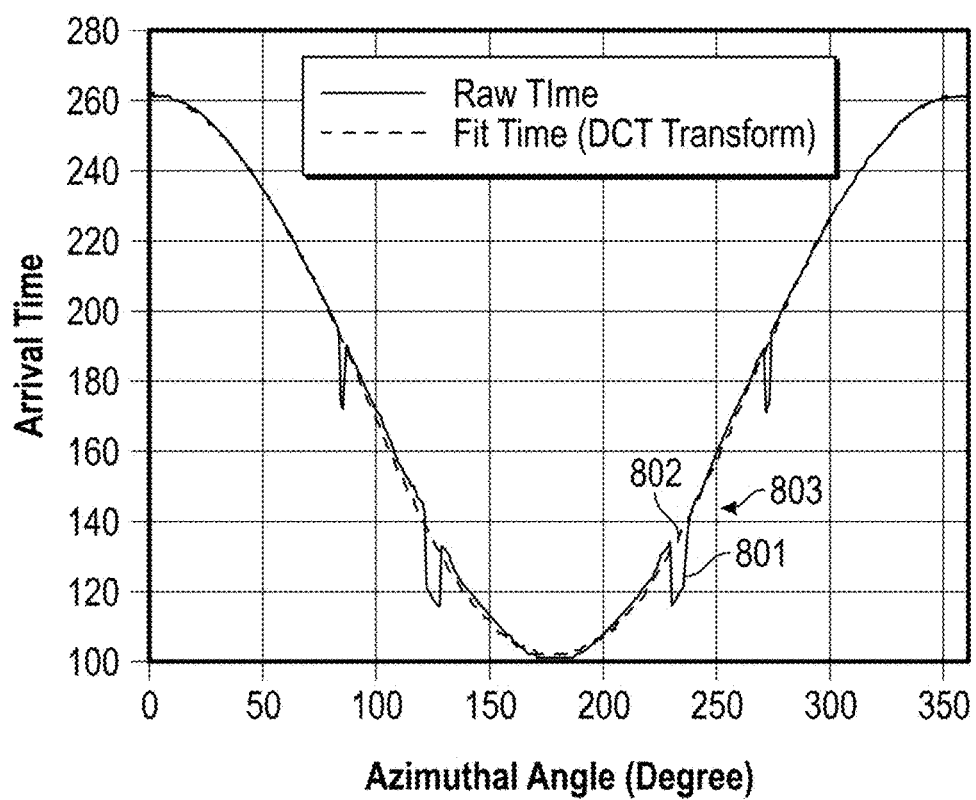
FIG. 8 is a graphical depiction of original arrival time measurements for one tool revolution in comparison to arrival time measurements after smoothing in accordance with embodiments of the present disclosure.

FIG. 8 is a graphical depiction of original arrival time measurements 801 for one tool revolution in comparison to arrival time measurements after smoothing 802 in accordance with embodiments of the present disclosure. In FIG. 8, a discrete cosine transform ('DCT') is used to extract the sinusoidal trend of the arrival time of one revolution. Other alternative methods may include, for example, Fourier transforms, average smoothing, median filtering, other techniques for curve smoothing, and so on. The irregularities 803 on original arrival time could be caused by fractures, inaccurate time detection, or weak echo-to-ringdown ratio, or the like.

Fracture effects may cause a significant amplitude drop on received amplitudes in comparison to a smooth borehole wall, as observed in FIG. 8 at particular azimuths. The samples of FIG. 8 may be characterized as being dominated by fracture effects. These effects may be eliminated by applying statistical analysis. For example, at each angle, samples whose amplitudes are larger than one standard deviation may be filtered out.

Figure 9:
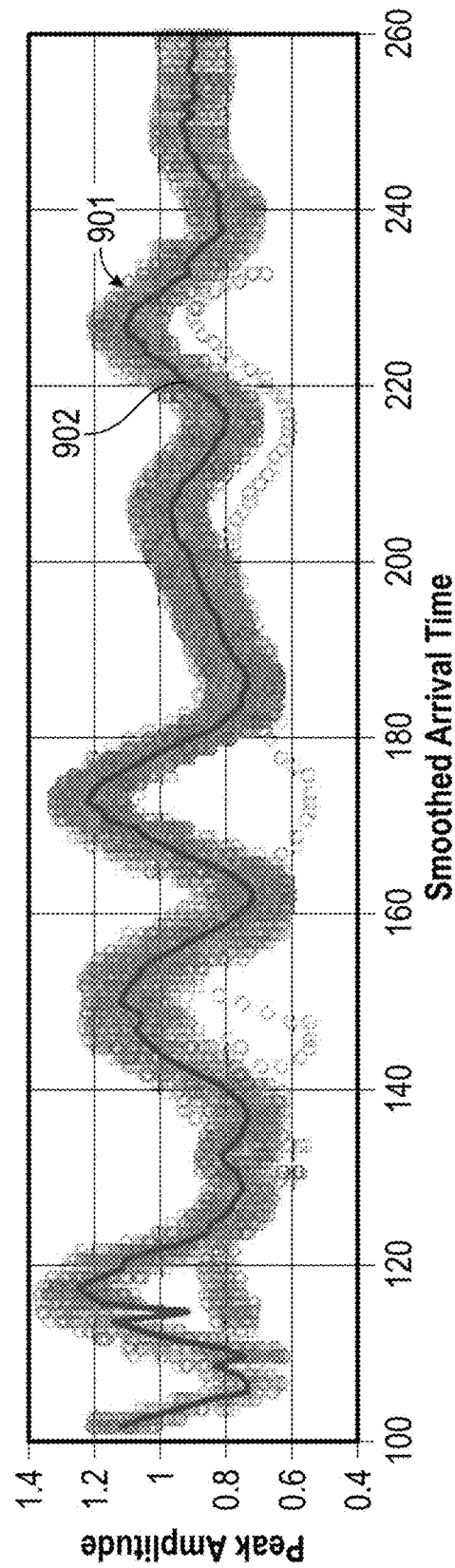
FIG. 9 illustrates construction of a background modulation template through statistical processing of the remaining samples.

FIG. 9 illustrates construction of a background modulation template through statistical processing of the remaining (non-discarded) samples. The mean value of remaining samples 901 at each azimuth may be used as the final modulation template 902 resulting from QC. The smoothed time image and final modulation template may be passed to the core processes and used for background image reconstruction.

The smoothed arrival time may be validated before use in the methods described above. For example, a correlation threshold may be set up using conventional correlation measures to validate the legitimacy of the smoothed arrival time. If the correlation is less than the threshold, it implies that the revolution is affected by environmental factors other than the eccentricity. In this case, the samples in the revolution are discarded; that is, they are not taken into account for template construction. Additionally or alternatively, an upper limit may be used to truncate the higher components of the DCT transform for time smoothing.

FIG. 10 is a synthetic example illustrating techniques in accordance with embodiments of the present disclosure. The synthetic example includes varying background impedance and fractures. QC has been applied to the measurements as described above (application of discrete DCT to arrival time values to remove borehole feature effects and 'one standard deviation' filter to the peak amplitude values to remove samples dominated by surface fractures or other outliers), resulting in revised measurements to generate the estimated varying interference pattern 1002. That is, the azimuthally varying interference pattern is estimated by correlating a time image measurement with the background modulation template. The applied time image reflects the modified arrival time measurements after application of DCT smoothing. Thus, the estimated varying interference pattern 1002 is dependent upon the revised measurements, and, accordingly, upon the QC techniques as described above with respect to FIG. 9.

For each respective depth, the estimated varying interference pattern may be subtracted from the echo peak amplitude values corresponding to the respective depth to generate adjusted echo peak amplitudes. Thus, in total, the complete estimated varying interference pattern (background image) 1002 may be subtracted from the complete initial image of simulated measurements (raw amplitude image) 1001 as would be taken by the tool from the borehole. The background "wood-grain" pattern is thus removed from the original image by subtraction, as shown, resulting in the adjusted image (final compensated image) 1003 substantially free from interference caused by ringdown effects, and preserving the borehole features. After image subtraction, the "wood-grain" pattern is significantly reduced and as a result, fractures are enhanced.

The method has been tested with synthetic examples and several wireline field ultrasonic imaging logs. Preliminary results have shown that the method can effectively remove substantially all background modulation noises and improve borehole image quality. Unlike various prior-art techniques that treat or correct for an individual source of noise (transducer ringdown, eccentricity, oblique reflection, mud attenuation, et al), this method is applicable to treat and correct for all of these noise sources simultaneously and holistically. Moreover it does not require a priori knowledge of material properties or the use of a theoretical model or inversion.

Figure 11A:
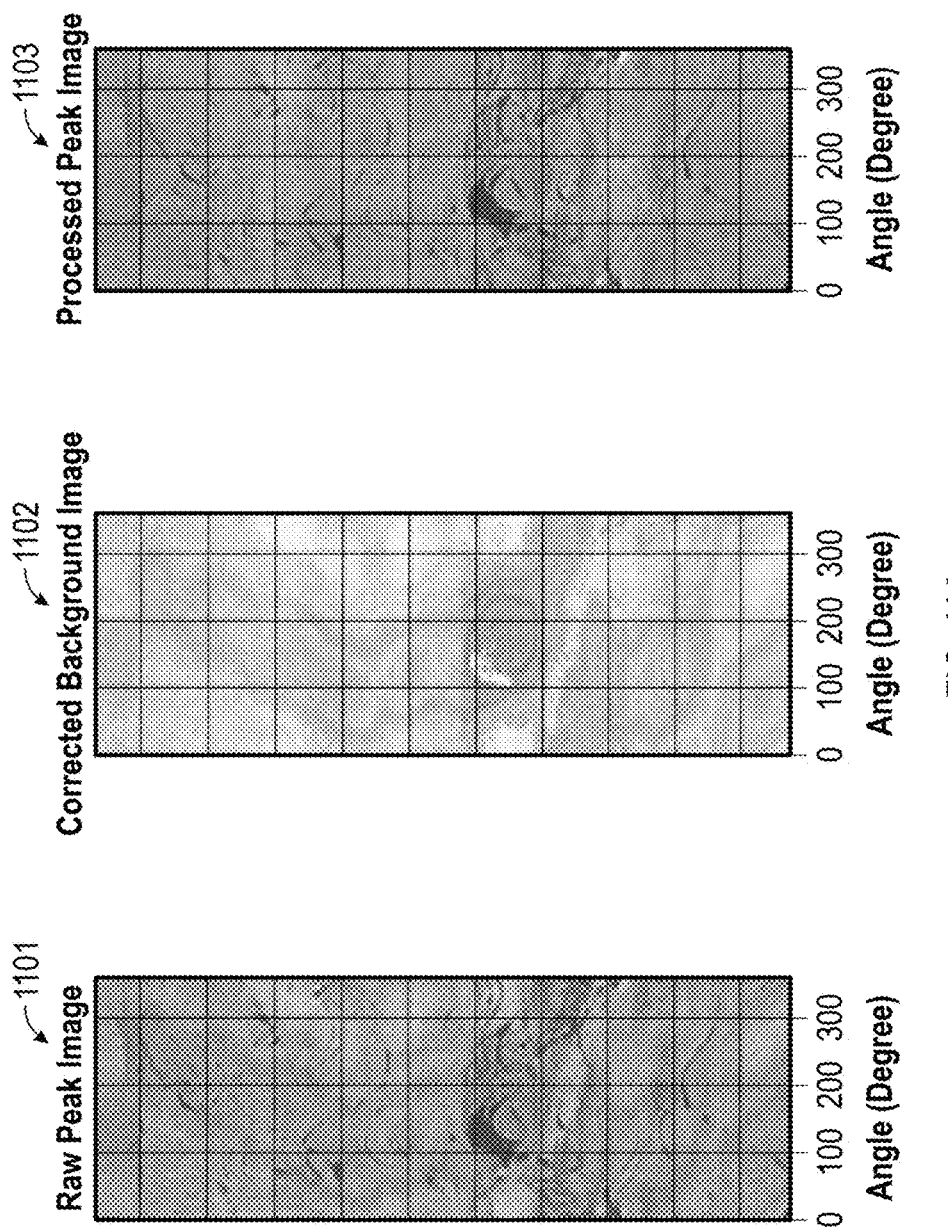
FIG. 11A-11C shows results from a field test illustrating techniques in accordance with embodiments of the present disclosure.
Figure 11B:
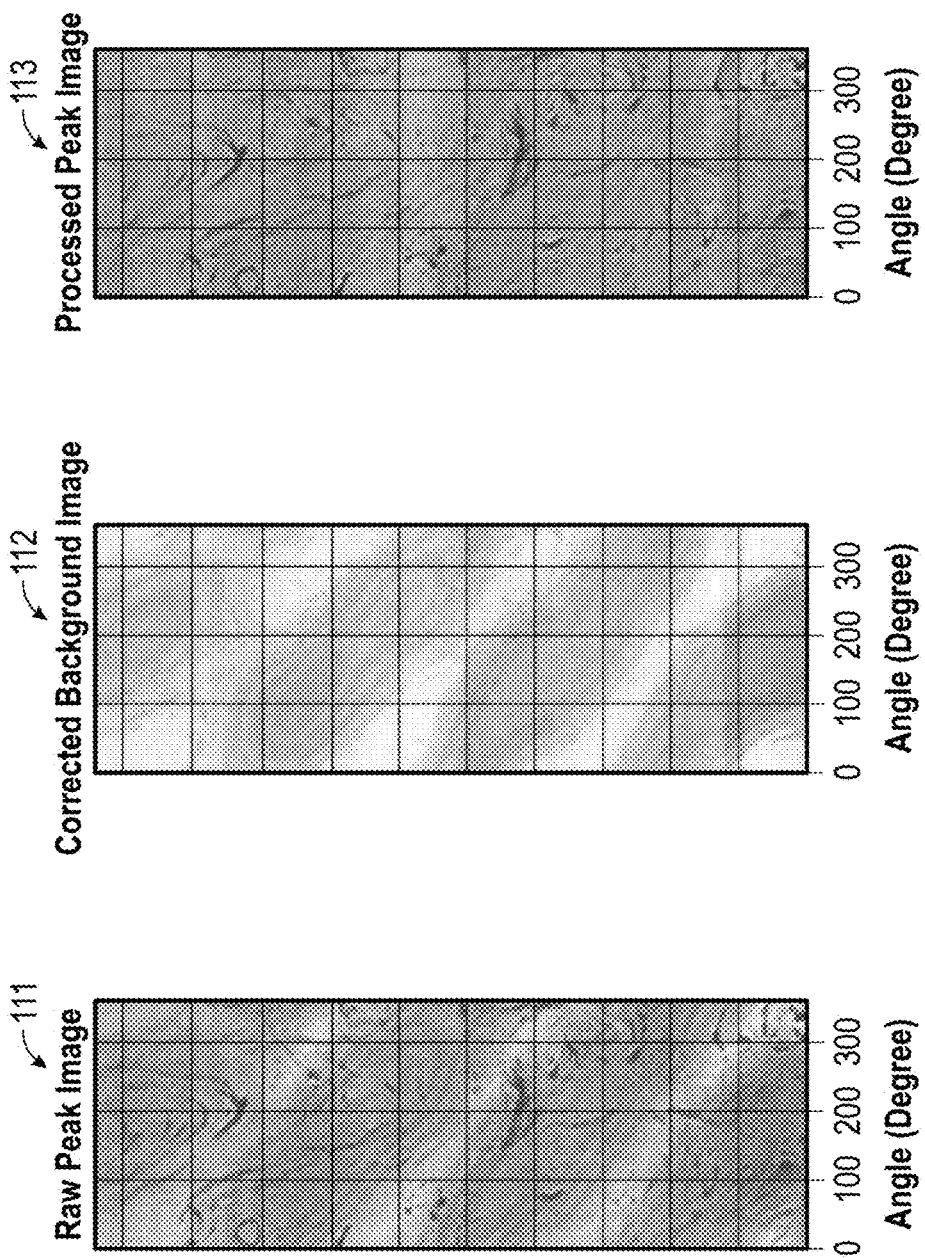
Figure 11C:
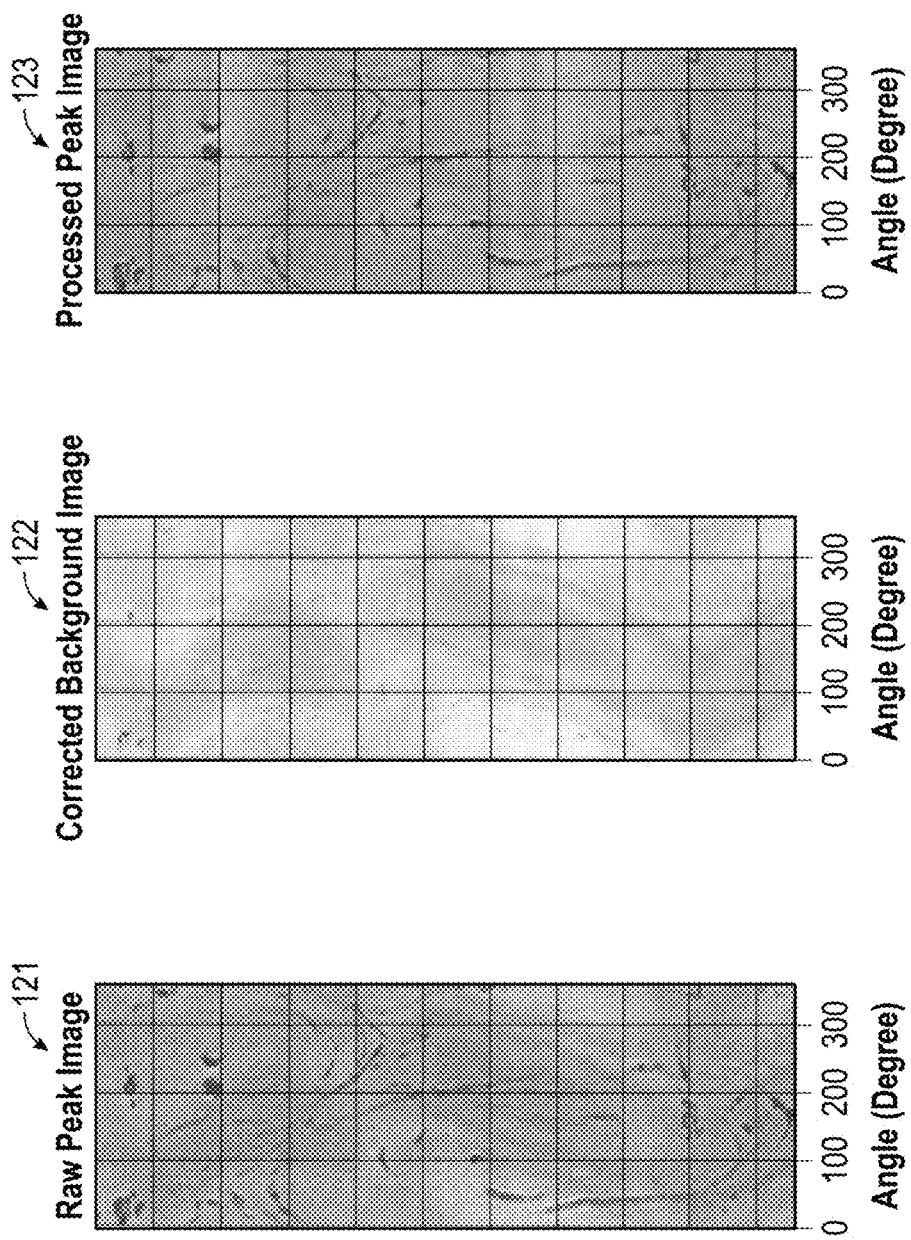

FIG. 11A-11C shows results from a field test illustrating techniques in accordance with embodiments of the present disclosure. A severe background interference pattern is demonstrated in the original images 1101, 1111, 1121, obscuring the formation features and making interpretation challenging. The cosmetic effect is pronounced. The respective complete estimated varying interference pattern (background images) 1102, 1112, 1122 is subtracted from the complete initial images of measurements (raw amplitude images) 1101, 1111, 1121 taken by the tool from the borehole, resulting in the adjusted images (final compensated images) 1103, 1113, 1123. The methods of the present disclosure effectively reduce the effects of the interference pattern in the adjusted images 1103, 1113, 1123; the background "wood-grain" pattern is removed from the original image by the subtraction, as shown. The results of the field test are thus substantially free from ringdown interference. Meanwhile, the background pattern does not contain borehole features and therefore the proposed method preserves the borehole features in the final processed image. Thus the efficacy of the technique is confirmed.

Figure 12:
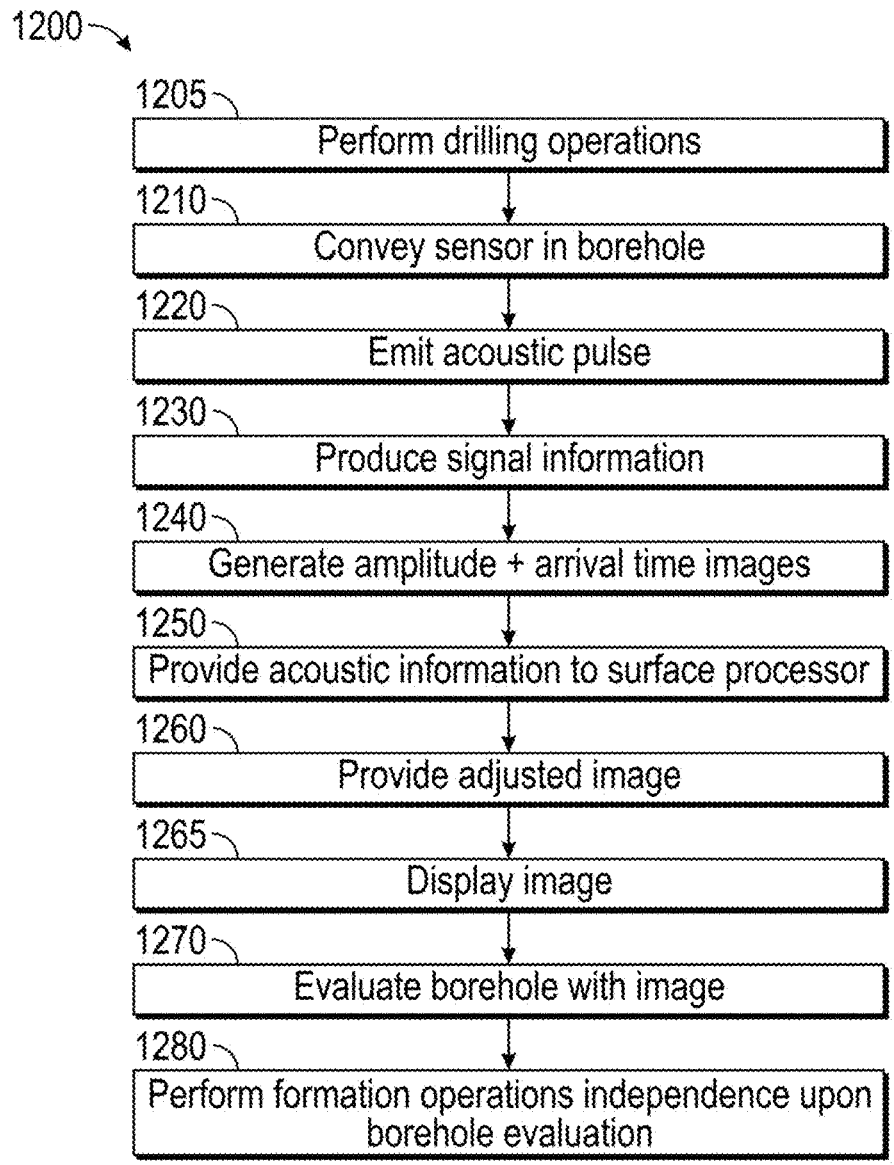
FIG. 12 illustrates a method for evaluating an earth formation intersected by a borehole using signals produced at a plurality of borehole depths by an ultrasonic transducer in the borehole.

FIG. 12 illustrates a method for evaluating an earth formation intersected by a borehole using signals produced at a plurality of borehole depths by an ultrasonic transducer in the borehole. Optional step 1205 of the method 1200 may include performing a drilling operation in a borehole. For example, a drill string may be used to form (e.g., drill) the borehole. Optional step 1210 may include conveying at least one acoustic sensor in the borehole on a conveyance device. The sensor may comprise part of an acoustic logging tool carried on a tool string.

Optional step 1220 of the method 1200 may include emitting an acoustic pulse. The acoustic pulse may be an ultrasonic pulse emitted by a transducer. In some embodiments, step 1220 may include emitting a pulse toward each of a plurality of azimuthally distributed orientations about an acoustic logging tool.

Optional step 1230 may include using the at least one sensor to produce information responsive to a detected acoustic signal. The sensor may include a receiving transducer, which may be the same transducer as the transmitting transducer, or a different transducer. The transducer may produce signals indicative of the received acoustic signals. The signals produced by the transducer include ringdown signals from the ultrasonic transducer and echo signals from a wall of the borehole from a plurality of azimuthal orientations. The acoustic signal may be indicative of a parameter of interest relating to the formation, the borehole, or fluids or equipment therein.

Optionally, at step 1230, the method may be carried out by using a transducer rotating about a substantially longitudinal axis of the logging tool to receive acoustic signals at each of the plurality of azimuthally distributed orientations. Step 1230 may further be carried out by rotating the transducer with respect to the carrier. As another option, step 1230 may be carried out by using a multi-directional acoustic sensor configured for beamforming to receive from each of the plurality of azimuthally distributed orientations the reflection of the corresponding emitted pulse. Alternatively, step 1230 may be carried out by producing the corresponding information from each of the plurality of azimuthally distributed orientations using each of a plurality of corresponding azimuthally distributed acoustic sensors.

Optional step 1240 may include processing the waveform information inherent in the signals produced by the ultrasonic transducer using at least one processor to generate an amplitude image and an arrival time image.

Optional step 1250 may include providing the acoustic information from well logging to at least one surface processor. Step 1250 may be carried out by transmitting the information uphole, either as an image or as waveform signal data. Alternatively, the information may be stored on the tool and retrieved when the tool has returned to the surface.

Step 1260 comprises using the surface processor to process the information to provide an enhanced adjusted image. The at least one surface processor may use the information (received as images or waveform data) to provide an image in accordance with the techniques as described above. Optional step 1265 comprises displaying the adjusted enhanced image.

Optional step 1270 comprises using the enhanced adjusted image from the at least one processor to evaluate the formation, the borehole, or fluids or equipment therein. This may include using the adjusted enhanced image to estimate a parameter of interest relating to the formation, the borehole, or fluids or equipment therein. Optional step 1280 may include using the parameter of interest or the evaluation to perform further formation operations.

Figure 13:
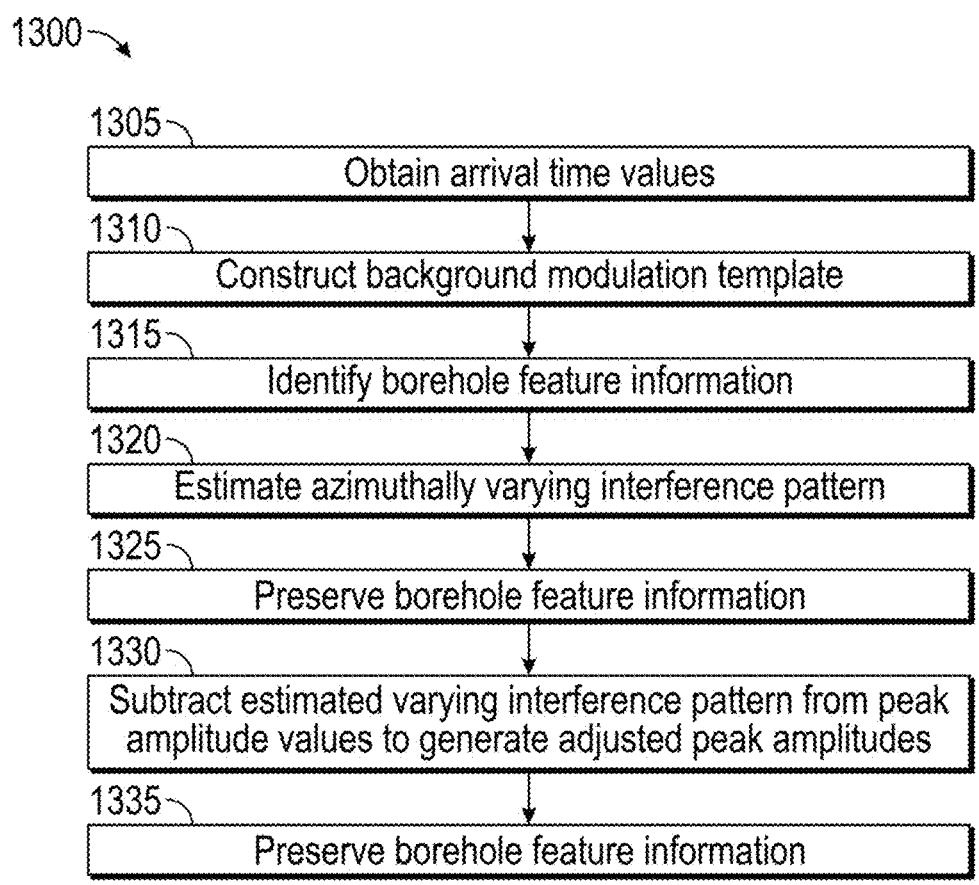
FIG. 13 illustrates a method for evaluating an earth formation intersected by a borehole using signals produced at a plurality of borehole depths by an ultrasonic transducer in the borehole by providing an adjusted enhanced image.

FIG. 13 illustrates a method for evaluating an earth formation intersected by a borehole using signals produced at a plurality of borehole depths by an ultrasonic transducer in the borehole by providing an adjusted enhanced image. The core steps of method 1300 include background modulation template construction (step 1310), azimuthally varying interference pattern estimation (step 1320), and adjusted peak amplitude generation (step 1330); these steps are performed for multiple borehole depths representing a length of borehole (e.g., a borehole segment). The steps for each depth may be performed sequentially or in parallel.

Step 1310 of method 1300 includes using peak amplitude values and arrival time values to construct a background modulation template corresponding to at least one depth, as described in greater detail above. Step 1310 may be carried out by generating a curve representing the background modulation template by mapping each peak amplitude value with respect to a corresponding arrival time value at the at least one depth.

Step 1320 of method 1300 includes estimating, for each respective depth of the plurality of borehole depths, an azimuthally varying interference pattern predominantly resulting from a ringdown signal for each respective depth by mapping the modulation template to arrival time values corresponding to the respective depth. This may be accomplished by correlating the arrival time values with the background modulation template.

Step 1330 of method 1300 includes subtracting, for each respective depth, the estimated varying interference pattern from the peak amplitude values corresponding to the respective depth to generate adjusted peak amplitudes. Optional step 1340 comprises generating a two-dimensional image of the earth formation using the adjusted peak amplitudes.

Optional step 1305 of method 1300 comprises obtaining arrival time values. Step 1305 may include determining initial arrival time values from the signals and then removing effects of features of the borehole. These effects may be removed by altering the arrival time data or discarding it. Step 1305 may include performing at least one of: i) discarding data corresponding to those values of the initial peak amplitude values which exceed a statistical deviation threshold; and ii) smoothing the initial arrival time values. Smoothing the initial arrival time values may be accomplished by applying at least one of: i) a discrete cosine transform, ii) a Fourier transform, iii) an average filter, iv) a mean filter, v) a median filter, vi) a bandpass filter, vii) a low pass filter, viii) a wavelet transform, and ix) curve fitting.

Optional step 1315 of method 1300 may include identifying borehole feature information in the background modulation template, such as, for example, by applying an image partition on the estimated varying interference pattern to determine residue containing borehole feature information. Optional step 1325 comprises preserving the borehole feature information. Optional step 1315 may be performed before or after step 1320. Optional step 1325 may be performed before and/or after step 1330. Preserving the borehole feature information may be carried out by modifying the background modulation template to preserve borehole feature information, by adding the residue to the adjusted peaks (e.g., amplitude mask), and other methods as will occur to those of skill in the art.

Method embodiments may include conducting further operations in the earth formation in dependence upon the estimated parameter, enhanced images, or upon models created using ones of these. Further operations may include at least one of: i) extending the borehole; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) evaluating the formation; and x) producing one or more hydrocarbons from the formation.

In some embodiments, the borehole may be utilized to recover hydrocarbons. In other embodiments, the borehole may be used for geothermal applications, water production, mining, tunnel construction, or other uses.

Herein, the term "information" may include one or more of: raw data, processed data, and signals. The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

Images may be stored (recorded) as information or visually depicted on a display. Aspects of the present disclosure relate to modeling a volume of an earth formation using an estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

In some embodiments stored data may be used in estimating parameters of interest and generating enhanced images. These data may be obtained by, for example, retrieving previously acquired data from a data repository, from local memory, or from other associated storage, or may be carried out by retrieving previously calculated or estimated parameters from such storage.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements made in wireline or MWD applications may be done by a surface processor, by a downhole processor, or at a remote location. The data acquisition may be controlled at least in part by the downhole electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "image" as used herein may refer to 2-D data representation of properties of a formation surrounding a borehole or the borehole itself. The representation facilitates conversion into a two-dimensional display, which may use colors or different gray scales to represent variations in values of a parameter of interest around the borehole against depth. The x-axis of the image may show different segments of the borehole displayed from the top of the hole clockwise around through the bottom and back to the top again. Depth may be in the z-axis, while the values of the parameter may be represented by different colors or shades from black to white.

The term "conveyance device" or "carrier" as used above means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors.

An information processing device may include a processor, resident memory, and peripherals for executing programmed instructions. In some embodiments, estimation of the parameter of interest may involve applying a model. The model may include, but is not limited to, (i) a mathematical equation, (ii) an algorithm, (iii) a database of associated parameters, (iv) an array, or a combination thereof which describes physical characteristics the formation, the borehole, borehole fluid, casing or other borehole equipment or infrastructure (standing alone or as installed) in relation to information received by the sensors described herein.

The term "near real-time" as applied to downhole evaluation described herein refers to generation of the adjusted image while the BHA is still downhole and prior to the drill bit extending the borehole a distance of 1 meter, 0.5 meters, 0.25 meters, 0.1 meters, or less.

The term "azimuthal distribution" refers to distribution over three or more points about a center, wherein any two consecutive points are less than 180 degrees apart. The term "substantially longitudinal axis" as applied to the rotational axis of a rotating transducers means an axis sufficiently close to a longitudinal axis of the carrier to receive at each of the plurality of azimuthally distributed orientations a reflection of a corresponding emitted wave from portions of a borehole wall adjacent the carrier.

As used herein, the term "fluid" and "fluids" refers to one or more gases, one or more liquids, and mixtures thereof. A "downhole fluid" as used herein includes any gas, liquid, flowable solid and other materials having a fluid property, and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, oils and solvents used in conjunction with downhole tools, water, brine, and combinations thereof. To the extent that the underlying formation feature is visible in the image, it can be said that image is substantially free from the stationary noise due to interference between the ringdown signal and the echo, and that the stationary noise has been substantially eliminated. As used herein, the term "irregular" refers to a pattern (e.g., a curve or waveform) that as a whole does not decay substantially according to predictable sinusoidal decay.

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A method of evaluating an earth formation intersected by a borehole using signals produced at a plurality of borehole depths by an ultrasonic transducer in the borehole, the signals produced by the transducer including ringdown signals from the ultrasonic transducer and echo signals from a wall of the borehole from a plurality of azimuthal orientations, the method comprising:
   using peak amplitude values and arrival time values from the signals to construct a background modulation template corresponding to at least one depth;
   estimating, for each respective depth of the plurality of borehole depths, an azimuthally varying interference pattern predominantly resulting from a ringdown signal for each respective depth by mapping the modulation template to arrival time values corresponding to the respective depth;
   subtracting, for each respective depth, the estimated varying interference pattern from the peak amplitude values corresponding to the respective depth to generate adjusted peak amplitudes; and
   generating a two-dimensional image of the earth formation using the adjusted peak amplitudes.

2. The method of claim 1 comprising identifying cement bonding information in the two-dimensional image.

3. The method of claim 1 wherein using the peak amplitude values and the arrival time values to construct the background modulation template comprises generating a curve representing the background modulation template by mapping each peak amplitude value with respect to a corresponding arrival time value at the at least one depth.

4. The method of claim 1 wherein mapping the background modulation template to the arrival time values corresponding to the respective depth comprises correlating the arrival time values with the background modulation template.

5. The method of claim 1 wherein the arrival time values are obtained by determining initial arrival time values from the signals and then removing effects of features of the borehole by performing at least one of: i) discarding data corresponding to those values of the initial peak amplitude values which exceed a statistical deviation threshold; and ii) smoothing the initial arrival time values.

6. The method of claim 5 wherein smoothing the initial arrival time values comprises applying at least one of: i) a discrete cosine transform, ii) a Fourier transform, iii) an average filter, iv) a mean filter, v) a median filter, vi) a bandpass filter, vii) a low pass filter, viii) a wavelet transform, and ix) curve fitting.

7. The method of claim 1 wherein the modulation template is irregular.

8. The method of claim 1 comprising identifying borehole feature information in the background modulation template; and preserving the borehole feature information.

9. The method of claim 8 comprising modifying the background modulation template to preserve borehole feature information.

10. The method of claim 9 wherein estimating the azimuthally varying interference pattern comprises generating an initial interference pattern and removing borehole feature information from the initial interference pattern to obtain the azimuthally varying interference pattern.

11. The method of claim 8 wherein subtracting the estimated interference pattern comprises applying an image partition on the estimated varying interference pattern to determine residue containing borehole feature information and adding the residue to the adjusted peaks.

12. The method of claim 1 wherein the arrival time values comprise an arrival time image and the peak amplitude values comprise an amplitude image.

13. The method of claim 1 wherein the signals result from a downhole operation in the formation, the downhole operation comprising at least one of: i) logging-while-drilling borehole imaging, ii) wireline borehole imaging, iii) casing inspection, and iv) cement evaluation.

14. An apparatus for evaluating an earth formation intersected by a borehole using signals produced at a plurality of borehole depths by an ultrasonic transducer in the borehole, the signals produced by the transducer including ringdown signals from the ultrasonic transducer and echo signals from a wall of the borehole from a plurality of azimuthal orientations, the apparatus comprising:
   a processor configured to:
      use peak amplitude values and arrival time values from the signals to construct a background modulation template corresponding to at least one depth;
      estimate, for each respective depth of the plurality of borehole depths, an azimuthally varying interference pattern predominantly resulting from a ringdown signal for each respective depth by mapping the modulation template to arrival time values corresponding to the respective depth;
      subtract, for each respective depth, the estimated varying interference pattern from the peak amplitude values corresponding to the respective depth to generate adjusted peak amplitudes; and
      generating a two-dimensional image of the earth formation using the adjusted peak amplitudes.

* * * * *